US 8,249,255 B2

(12) United States Patent
Gluck et al.

(10) Patent No.: US 8,249,255 B2
(45) Date of Patent: Aug. 21, 2012

(54) SYSTEM AND METHOD FOR SECURING COMMUNICATIONS BETWEEN DEVICES

(75) Inventors: Daniel S. Gluck, New York, NY (US); Steven D. Infante, New Windsor, NY (US); Aparna Mangari, Piscataway, NJ (US)

(73) Assignee: Sumcorp LLC, New York, NY (US)

( * ) Notice: Subject to any disclaimer, the term of this patent is extended or adjusted under 35 U.S.C. 154(b) by 1463 days.

(21) Appl. No.: 11/184,333

(22) Filed: Jul. 19, 2005

(65) Prior Publication Data
US 2006/0008082 A1 Jan. 12, 2006

Related U.S. Application Data

(63) Continuation-in-part of application No. 10/287,927, filed on Nov. 1, 2002, now abandoned.

(51) Int. Cl.
*H04L 29/06* (2006.01)
(52) U.S. Cl. .................................................. 380/255
(58) Field of Classification Search .................. 380/255
See application file for complete search history.

(56) References Cited

U.S. PATENT DOCUMENTS

| | | | |
|---|---|---|---|
| 4,229,818 A | 10/1980 | Matyas et al. | |
| 4,853,962 A * | 8/1989 | Brockman | 380/44 |
| 5,001,754 A * | 3/1991 | Deffeyes | 380/46 |
| 5,003,596 A * | 3/1991 | Wood | 380/28 |
| 5,412,723 A * | 5/1995 | Canetti et al. | 713/155 |
| 5,537,438 A | 7/1996 | Mourot et al. | |
| 5,706,281 A | 1/1998 | Hashimoto et al. | |
| 5,809,147 A | 9/1998 | De Lange et al. | |
| 5,956,405 A | 9/1999 | Yuval | |
| 6,085,207 A | 7/2000 | He | |
| 6,246,768 B1 | 6/2001 | Kim | |
| 6,608,901 B2 | 8/2003 | Scheidt et al. | |
| 6,917,684 B1 * | 7/2005 | Tatebayashi et al. | 380/44 |
| 2002/0015492 A1 | 2/2002 | Ohmori et al. | |
| 2002/0146118 A1 | 10/2002 | DiSanto et al. | |
| 2003/0108196 A1 | 6/2003 | Kirichenko | |
| 2003/0156715 A1 | 8/2003 | Reeds, III et al. | |
| 2003/0204741 A1 | 10/2003 | Schoen et al. | |
| 2005/0166058 A1 * | 7/2005 | Brokenshire et al. | 713/181 |

OTHER PUBLICATIONS

Bruce Schneier, Applied Cryptography, 1996, John Wiley & Sons, Inc., Seconde Edition, Chapter 1, Setion 1.5, pp. 15-17.*

* cited by examiner

*Primary Examiner* — Michael S McNally
(74) *Attorney, Agent, or Firm* — K&L Gates LLP

(57) ABSTRACT

A system and method for providing an improved way to secure messages being transmitted between communicating devices. Security mechanisms, operating below the session establishment level, provide fast encryption that is unconditionally secure or becomes stronger over time as devices continue to communicate. After random or arbitrary characters are used to encrypt an initial message, each new message communicated between two devices is encrypted with the most recent message communicated there-between as well as the changing key. Moreover, an exclusive dyadic relationship between the devices is obtained which prevents the cloning or piracy of the devices or the data communicated between them. The disclosed system and method also provide a multi-threading capability, thereby reducing the likelihood of a denial of service of attack.

25 Claims, 25 Drawing Sheets

FIG. A-3

SYSTEM AND METHOD FOR SECURING COMMUNICATIONS BETWEEN DEVICES

CROSS REFERENCE TO RELATED APPLICATION

This application is a Continuation-in-Part of prior U.S. patent application Ser. No. 10/287,927, filed Nov. 1, 2002 now abandoned, published May 6, 2004, Publication No. U.S. 2004/0088539. Such application is incorporated herein by reference.

NO GOVERNMENT RIGHTS

No federally-sponsored research or development was involved with this application.

FIELD OF THE INVENTION

The present invention relates to network data communications, and more particularly ensuring that an intercepted message by an unauthorized party is unintelligible to that party. It also relates to anti-piracy encryption, and more particularly ensuring that a server device can communicate data securely with a receiving device avoiding the possibility that the receiving device could be cloned or compromised such that the copies in addition to the original could continue to receive data from the server device.

BACKGROUND OF THE INVENTION

The proliferation of users and services on computer networks such as the Internet and local networks such as cable TV networks or cellular phone networks or corporate LANs raises security concerns for both users and service providers. Users want the data they submit or receive on such networks to be free from unauthorized interception and use. Similarly, service providers want their hosts and systems secured from unauthorized access and intrusion by "pirates" or "hackers."

Global or large multiple user computer networks such as the Internet often allow users to access many different hosts and services from their computers via a single access connection. While this has enhanced users' abilities to access information and conduct business, large-scale networking has greatly complicated service providers' security mechanisms.

In any communication of data, the users desire data security consisting of (a) confidentiality from others, (b) authentication to ensure they know with whom they are communicating, (c) integrity to ensure that the message has not been modified in transit, and ideally, (d) non-repudiation to prevent a sender from falsely denying that a message was sent or received.

The need for data security extends to any communication of data between any two devices (dyads), whether or not they are online on the Internet. Networks can be thought of as groups of dyadic relationships between devices. Other examples of networks or dyads of devices where data security is an important issue include: a network of devices for the provision of a cable TV signal, a network of wired and/or wireless devices within a corporation or building, the wireless data medium between a cordless phone base and its handset, the wired and wireless network of devices for the provision of Satellite TV signal, a network of wired and wireless devices for the provision of cellular phone communications, a network of wired and wireless devices for the provision of radio communications, and many others.

One method of attempting to ensure confidentiality and sometimes authentication, integrity and non-repudiation is encryption. Data that is readily perceived is often known as plaintext, while plaintext that has been transformed via a cipher or a form of encryption may be known as ciphertext.

Another method of ensuring that no one else can intercept a communication is to ensure that it takes place away from any potential eavesdroppers. This is sometimes known as obscurity rather than security. For example, if secret encryption keys need to be exchanged between a telephone base unit and a cordless handset, it may be possible to do that at the factory before they are ever sold. The same might be true of military radios, or cable TV (CATV) servers and set-top boxes.

Cryptanalysis is the process of determining plaintext or the key on which an encryption algorithm is based, usually by using the ciphertext and knowledge of the algorithm.

One form of cryptanalysis is known as a "brute force attack." A brute force attack generally is the attempt to try every possible key or every possible plaintext for a given block of ciphertext. Forms of encryption where the time or resources to try every possible plaintext or key are unreasonable can be known as computationally secure. Brute force attacks are not possible where no matter how much ciphertext a cryptanalyst has, it is not possible to figure out the plaintext or the key even with unlimited computer resources. Such an encryption algorithm would be considered unconditionally secure.

Currently used computationally secure encryption systems generally suffer from the fact that new methods of cryptanalysis are always being developed. Even if a particular system is considered secure today, it may be considered insufficiently secure in the near future. An unconditionally secure system does not suffer from that insecurity. For example, the new field of quantum cryptography may destroy most or all conditional security systems because processes now considered one-way may be far easier to compute with quantum based computing systems or methods. Easier computing of integer factoring, at the heart of public key cryptography, could lead to the rapid demise of this core encryption technology.

A key goal of encryption algorithms in general is the preservation of confidentiality of messages being transmitted between parties. Prior art ciphers are designed to protect against a security attack known as a "man in the middle" attack. Such an attack comprises an unauthorized party eavesdropping on a communication. Moreover, an unauthorized party intercepting insecure communications between parties may be able to substitute keys or messages that are sent back and forth between the respective parties to fool the parties into believing they are communicating with each other. Although prior art authentication measures minimize the likelihood of a man in the middle attack, the security of the messages is not guaranteed where either a man in the middle could impersonate one or both of the devices, or mount a cryptanalytic attack or a brute force attack to discover the key or the plaintext of messages. A method of encryption that minimizes or reduces the risks of a man in the middle attack remains desirable. A method of encryption that was unconditionally secure would provide such service, particularly if it also afforded or could be integrated with authentication, data integrity measures and non-repudiation.

One form of unconditionally secure encryption is known as the one-time-pad (OTP) which was patented in 1919 (1,310, 719) in the context of the telegraph machine. Because it involves a random key character used to encrypt each character of plaintext, there is no information in the ciphertext on which to use cryptanalysis. The number of possible keys approaches infinity and even if some of them were guessed and operated on the ciphertext to produce meaningful plaintext, there would be no way to know which of the multitude of plaintexts rendered was the intended one. However, the commercial use of a OTP is extremely limited because the key needs to be as long as all messages ever to be conveyed using the system, and no part of the key could ever be reused There remains a commercial and societal need for an unconditionally secure system of encryption.

In addition, existing encryption systems are difficult to employ where the speed of the communication is critical, for example where the bandwidth of the medium of communication is limited relative to the data flow. In addition, where the processing of the encryption algorithm is complex, its speed may be insufficient for certain applications, such as those that require realtime communication. For example, current encryption systems are impractical today where the speed of the communication, whether wired or wireless, is sufficient for the message, but insufficient for both the message and encryption. Music, voice and video, as well as many other forms of data are difficult to encrypt in real time because of bandwidth and speed constraints.

One of the reasons most prior art encryption systems are slower than optimal for many commercial applications is that they use one or more complex one-way functions. A one-way function is far more difficult to compute in one direction than another. A simple example is square/square roots. It is simpler to compute the square of a number than the square root. However the types of one way functions used by most encryption take far longer to compute in either direction than the present invention which uses only the comparatively fast operations of modified addition and modified subtraction.

Another reason most prior art encryption systems are slower than optimal and slower than the present invention is that they consist of far more numerous operations than the present invention. For example, on average most commonly used encryption methods use 6-50 operations per byte of plaintext to be encrypted. Also, the more complex the encryption system, usually the more expensive it is to deploy and use. The present invention fills a social and commercial need for a simple and fast strong encryption method and system.

Another reason prior art encryption techniques can be slow is that they generally require the complex generation and transmission of keys. The present invention provides an embodiment not requiring any transmission of keys and another which functions on the rapid generation and transmission of very simple keys.

While prior art encryption methods attempt to assure secure communication sessions, the level of security associated therewith often remains within a single state. The methods are static in that the keys that are used to encrypt and decrypt the messages remain the same during a single communication session.

There are currently many algorithms, systems, and protocols to accomplish each of the goals of (a) confidentiality, (b) integrity, (c) authentication and (d) non-repudiation. However there is no other technology today that can conveniently provide the high speed processing and unconditional security which would be a commercially useful improvement to many of today's applications and would also facilitate the creation of new high-bandwidth or high-speed secure applications.

The present invention provides for high speed dynamically changing security to accomplish (a) confidentiality, and can both work with any other encryption method and facilitate or incorporate any other method of accomplishing (b) integrity, (c) authentication, and (d) non-repudiation. Such security is in some embodiments unconditional.

Another application of encryption is to ensure the exclusivity of a dyadic communication. In other words, if A is a server communicating with a client B, neither wants C to be able to substitute itself for B, and A does not want C to be able to copy B such that there are multiple clients on B's account, or non-paying clients without an account.

What is needed is a method for protecting data from being stolen while in transit, and a method for protecting client data receivers, like Cable TV set-top boxes or their significant components like smart cards or point of deployment modules, from being cloned or copied.

Some systems are primarily designed as one to many networks, such as cable TV or satellite TV systems. A content server or head-end originates a datastream to many, sometimes millions of clients or set-top boxes. Along the way there may be dozens of nodes which receive the datastream and relay it to one or more other nodes. There may be scrambling, or encryption, such as that of the present invention, on the data stream at any or every point from the content server to the ultimate user. The data encrypted could be all the data or only a portion or only metadata rather than the actual TV signal.

In addition, some systems becoming commercially more attractive are already one to one systems, such as certain forms of movies on demand, music on demand and television on demand.

It is, therefore, desirable to provide an efficient fast system for securing a communication session such that an intercepted message from an unauthorized party cannot be deciphered. It is, also desirable to provide an efficient and fast system for preventing the piracy or theft of a data signal.

SUMMARY OF THE INVENTION

The present invention provides an improved way to secure messages being transmitted between communicating devices, and an improved way to create an exclusive dyadic communication between a data server and its client or customer such that the client device could not be cloned and the data signal could not be pirated. An overview is presented in FIG. 3.

The present invention may be used on any devices able to communicate with each other digitally, on any platform, using any programming language or system. This could include computers, cell phones, radios, satellite phones, satellite TV transmitters and receivers, cable TV head-ends or nodes and set-top boxes or points of deployment modules, cordless phones, wireless devices on a network, etc.

The only necessary parameters that the devices must share are: an agreed upon page size, one or more keys or subkeys, and a security index or agreed upon number of blocks of data to be processed before the key or keys are updated.

All data to be processed must be parsed into records, each of which is the page size.

The key, or preferably keys, must each be the page size, and must be identical between the devices communicating.

There are two primary stages to the process: first, in which each record is encrypted for transmission; and second, in which the key or keys are updated.

In one embodiment, there is a single key, and each record is encrypted for transmission by modified addition. That is, it is added character by character, each character to the corresponding character in the key, such that the result of the addition would be no longer than a character in length. This can be accomplished by subtracting the base from any result that would otherwise be greater than the base. This is another way of saying that if the result is longer than a one byte character in length, the most significant byte is truncated. This could take place in a computer's native binary code, or any other base system.

In the second stage of encryption, after the number of records that have been encrypted is equal to the security index, the key is updated by one of two methods. The key is added to all the ciphertext records created in the first stage, by the same modified addition process as above. In other words, all the ciphertext is added to the key, character by character, each character to the corresponding characters in the key and in each other ciphertext block, such that the most significant digit of the result is omitted or dropped if the result would be longer in length than one character. The result is saved as the new key.

In the single key embodiment, the security index must be greater than one in order for the process to be secure.

In the preferred embodiment, for each of the security index number of plaintext records, there is a subkey of the same length, and in addition there is a master subkey of the same length. In the first stage, each plaintext record is encrypted with both its corresponding subkey and the master subkey, character by character in the modified addition method described herein to create a ciphertext record. In the second stage, the master subkey is updated by adding it, in the same modified addition method to all the plaintext records in that security index. Then, each other subkey is updated by adding, in the same modified addition method, the corresponding bucket of ciphertext to the new master subkey just created.

In any embodiment, the process can be repeated for any number of additional records that need to be communicated constituting any number of messages or documents or files from either of the devices communicating. Other data, such as sessionIDs, device unique IDs, timestamps, Cyclic Redundancy Checks, Checksums, or indicator codes such as Message Number, Record Number, End of Message, End of Record, and the like, may also be included within records. A coding system which envelopes the data in codes, such as XML, is a preferred possible application of the present invention.

If any particular record is smaller than the page size, it may be padded with random, pseudorandom or arbitrary data as described below. Records may be sent from either device, in either direction, and may be sent in any particular order as long as they include addressing information that would allow the receiving device to reorder the records properly and distinguish which belongs to which message.

This process may be used to secure data communicated between any two devices, and therefore may also be used to create an exclusive dyadic communication between a data server and its client or customer such that the client device could not be cloned and the data signal could not be pirated. Since the key or keys are updated in parallel on the two devices based on the datastream between them, if the client device is copied and then either the copy or the original communicates any data to the server, the other copy will no longer have the same key or keys as the server and will not be able to communicate with it.

Because the key or keys used in the present invention may be stored on each device for future secure communications, this invention also allows a rapid form of authentication between the two devices by use of a method to look up the previously used parameters, including the previously used key or keys. Once each device has located the previously used parameters, they are able to encrypt and agree on a new sessionID, and are then they are authenticated to each other.

Other features and advantages of the present invention will become apparent from the following description of the invention which refers to the accompanying drawings.

More specifically, the present invention comprises a method for securing a message communicated between a first device and a second device, said method comprising:

receiving encoding information from said first device, said encoding information transmitted to said second device in response to a request from said second device to communicate a first message to said first device;

encrypting said first message with said encoding information and storing said encrypted first message in a first memory; transmitting said encrypted first message to said first device by said second device;

receiving said encrypted first message from said second device by said first device, decrypting said encrypted first message with said encoding information, and storing said encrypted first message in a second memory;

generating a second message by said second device, and encrypting said second message with said encrypted first message stored in said first memory; transmitting said encrypted second message to said first device by said second device; and decrypting said encrypted second message by said first device with said first encrypted message stored in said second memory.

In another embodiment, the invention comprises a method for securing a message, said method comprising:

generating a first message;

receiving encoding information, said encoding information transmitted in response to a request to communicate said first message;

encrypting said first message with said encoding information and storing said encrypted first message in a first memory; transmitting said encrypted first message;

generating a second message, and encrypting said second message with said encrypted first message stored in said first memory; and transmitting said encrypted second message.

In another embodiment, the invention comprises a system for securing a message, said system comprising:

a first device, said first device receiving encoding information from a second device, said encoding information transmitted to said first device in response to a request from said first device to communicate a first message to said second device;

an encryption module, said encryption module encrypting said first message with said encoding information;

a storage module, said storage module storing said encrypted first message in a first memory;

a transmission module, said transmission module transmitting said encrypted first message from said first device to said second device;

a reception module, said reception module receiving said encrypted first message by said second device from said first device;

a decryption module, said decryption module decrypting said encrypted first message with said encoding information, said storage module storing said encrypted first message in a second memory;

said first device generating a second message, said encryption module encrypting said second message with said encrypted first message stored in said first memory; said transmission module transmitting said encrypted second message to said second device; and said decryption module decrypting said encrypted second message by said second device with said first encrypted message stored in said second memory.

In another embodiment, the invention comprises a method of encrypting a string of digits, comprising the steps of:

(a) adding one digit of said string to one digit of at least one encryption key;

(b) truncating the most significant digit of the result if the result is longer than one digit; and (c) repeating steps (a) and (b) for the next digit in the string until the end of the string is reached.

In another embodiment, the invention comprises a method of updating an encryption key, the key being formed of a series of digits, comprising the steps of:

(a) adding one digit of said key to at least one digit of a data string;

(b) truncating the most significant digit of the result if the result is longer than one digit; and (c) repeating steps (a) and (b) for the next digit in the key until the end of the key is reached.

In another embodiment, the invention comprises a method of encrypting and communicating data between two devices, the data being formed of a string of digits, comprising:

(a) storing an initial encryption key at first and second devices;

(b) breaking the data into pages at the first device, each page being of the same size as the initial encryption key;

(c) adding each digit of the data at the first device to a corresponding digit in the initial key;

(d) truncating the most significant digit if the result of step (c), for any digit, is longer than one digit;

(e) sending the result of step (d) to the second device; and (f) replacing the initial encryption key with a new encryption key at the first device, the new encryption key being formed from a combination of the initial encryption key and the data; and (g) repeating steps (b) through (e) using the new encryption key In another embodiment, the invention comprises a method for securing data communicated between at least two devices, comprising:

(a) storing an initial key of arbitrary data of a certain page size at each of a first and second device;

(b) selecting a security index at such first and second devices;

(c) extracting a page of data from a message at the first device, the page of data having a page size and containing characters;

(d) performing a modified addition operation on the page of data and the initial key where such modified addition operation consists of adding each character from the page of data to its corresponding character in the initial key and then dropping the most significant digit of each character of the result if the result is longer in length than one character;

(e) storing the resulting page to a first bucket of memory space, and transferring it from the first device to the second device; and (f) performing a modified addition operation on a next page of data of such page size from such message and the initial key, storing the resulting page to a second bucket, and transferring such resulting page from the first device to the second device;

(g) repeating step (f) on all subsequent pages of data extracted from the message and storing each result to a next bucket on each device until the number of buckets filled on each device equals such security index;

(h) when the number of buckets filled on any device equals the security index, performing on each device a modified addition operation on the initial key and the data in all of such buckets and storing the resulting page as a new key to replace the initial key on that device; and (i) repeating steps (a) through (h) until the entire message has been processed and transferred.

In another embodiment, the invention comprises a method for securing data communicated between at least two devices, comprising:

(a) storing an initial key of data at a first device and a second device;

(b) selecting a page size at the first and second devices;

(c) selecting a security index at the first and second devices;

(d) selecting a page of data extracted from a message, the page of data containing characters;

(e) performing a modified addition operation on the page of data and the initial key where such modified addition operation consists of adding a character from the page of data to its corresponding character in the initial key and then truncating the most significant digit of each character of the result if the result of the modified addition operation is longer in length than one character;

(f) repeating steps (a) through (e) for all characters in that page of data, storing the resulting page in a first bucket of memory space, and sending the data in the first bucket to the second device;

(g) performing a modified addition operation on the next page of data and the initial key, storing the resulting page in a second bucket, and sending the data in the second bucket to the second device;

(h) repeating step (g) on all subsequent pages of data extracted from the message and storing each result to a next bucket on each device until the number of buckets filled on each device equals the security index;

(i) when the number of buckets filled on any device equals the security index, performing on each device a modified addition operation on the initial key and on all of the buckets;

(j) storing the result as a new key to replace the initial key on that device; and (k) repeating steps (a) through U) until all data to be communicated has been processed and transferred.

In another embodiment, the invention comprises a method for securing data communicated between at least two devices, comprising:

(a) storing an initial MasterSubKey of data of a certain page size at each of a first device and a second device;

(b) selecting a security index at the first device and at the second device;

(c) storing a plurality of initial subkeys of data at the first and second devices, the number of subkeys being equal to the security index, each subkey having a size equal to the page size;

(d) extracting a first page of data from a message at the first device, the page of data containing characters, each character being represented by a string of digits;

(e) performing a modified addition operation on the first page of data and the first initial subkey, where the modified addition operation consists of adding each character from the page of data to its corresponding character in the initial key and then dropping the most significant digit of the result, on a character-by-character basis, if the result for any character is longer in length than one character;

(f) storing the resulting page of data to a first bucket of memory space at the first device;

(g) transferring the first page of data from the first device to the second device;

(h) performing a modified addition operation on the next page of data of the page size from the message and the next initial subkey to create a next page of data, storing the resulting page to a next bucket, and transferring the resulting next page from the first device to the second device;

(i) repeating step (h) on all subsequent pages of data extracted from the message and subsequent initial subkeys and storing each resulting page to a next bucket at the first device, and transferring it from the first device to the second device, until the number of buckets filled equals the security index;

(j) when the number of buckets filled on either the first or second device equals the security index, performing at that device a modified addition operation on each initial subkey, its corresponding bucket of data, and the MasterSubKey, where the modified addition operation consists of adding each character from the initial subkey to its corresponding character in the corresponding bucket of data and the MasterSubKey and then dropping the most significant digit of the result if the result is longer in length than one character, and storing the resulting page as a new subkey to replace the initial subkey on that device;

(k) repeating step 6) until all initial subkeys have been replaced, and then emptying all buckets;

(l) repeating steps (a) through (k) until all data has been processed and transferred to at least one device.

In another embodiment, the invention comprises a method for securing a message communicated between at least a first device and a second device, comprising:

(a) receiving parameters at the first and second devices, the parameters including a page size, a security index and an initial key;

(b) determining the page size from a message size;

(c) parsing the message into a plurality of records of data characters, the number of records being equal to the page size;

(d) encrypting each record using a binary addition operation;

(e) padding at least one record with arbitrary data;

(f) repeating step (c) a number of times equal to the security index;

(g) updating the key;

(h) performing a cyclic redundancy check operation and a Base64 operation on each encrypted record;

(i) sending the encrypted message from the first device to the second device; and (j) decrypting the message at the second device using a binary subtraction operation

BRIEF DESCRIPTION OF THE DRAWINGS

For the purpose of illustrating the invention, there is shown in the drawings a form which is presently preferred, it being understood, however, that the invention is not limited to the precise arrangement shown, in which.

In addition, the following drawings are referred to in the appendix hereto.

Figure 19:
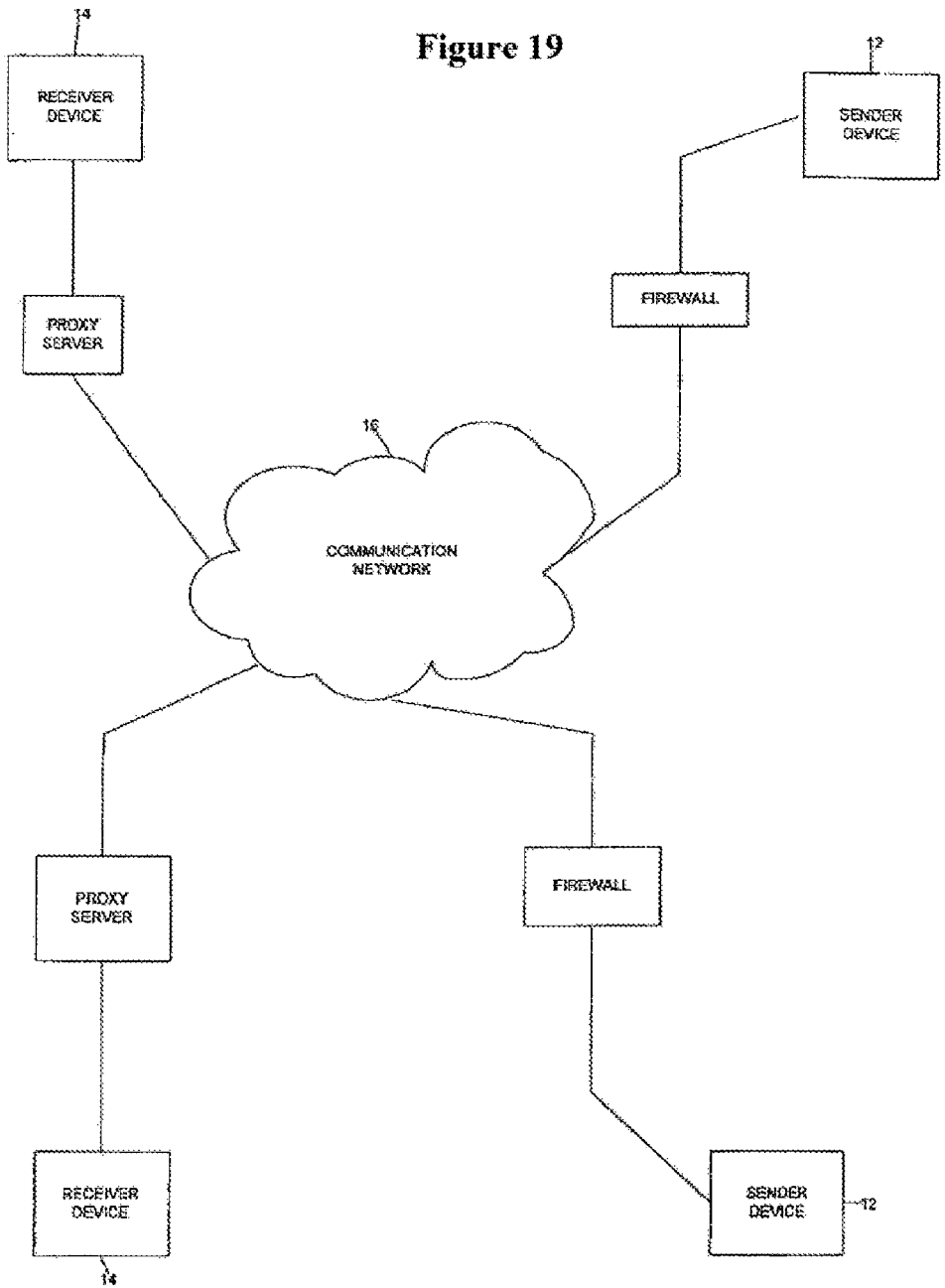
Figure 20:
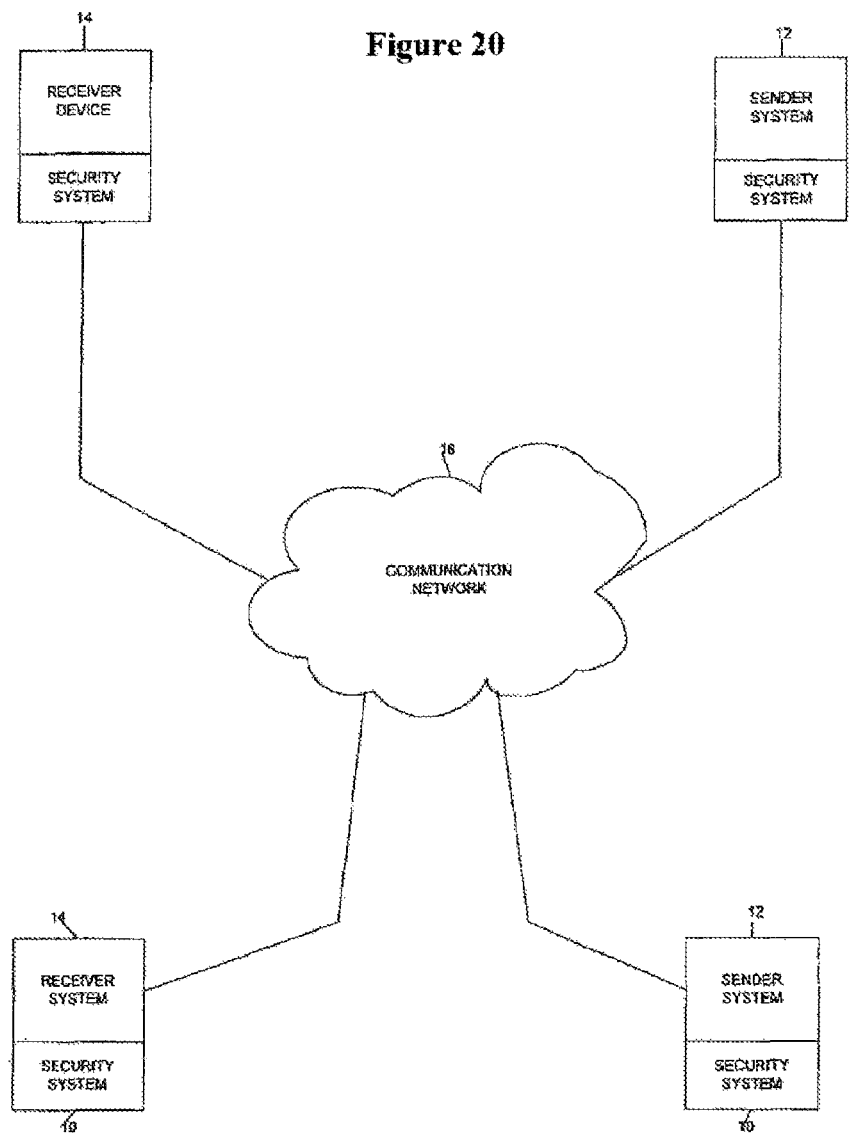
Figure 21:
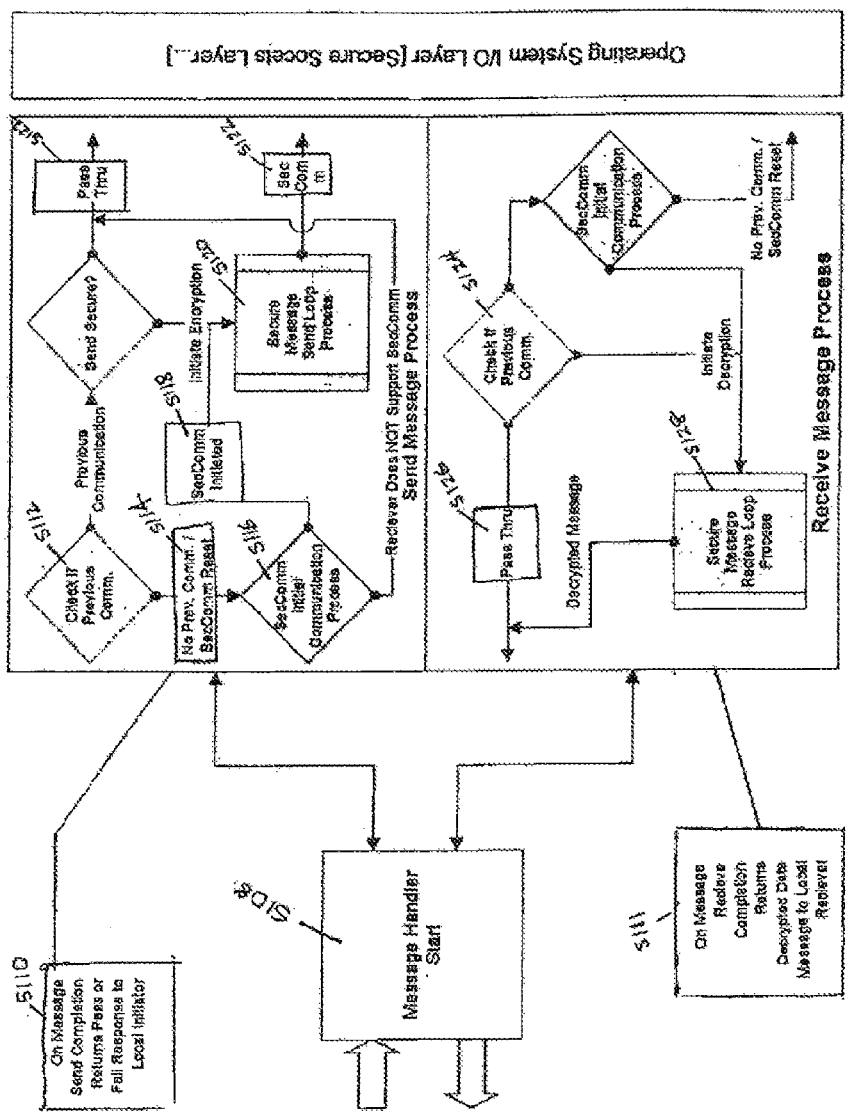
Figure 22:
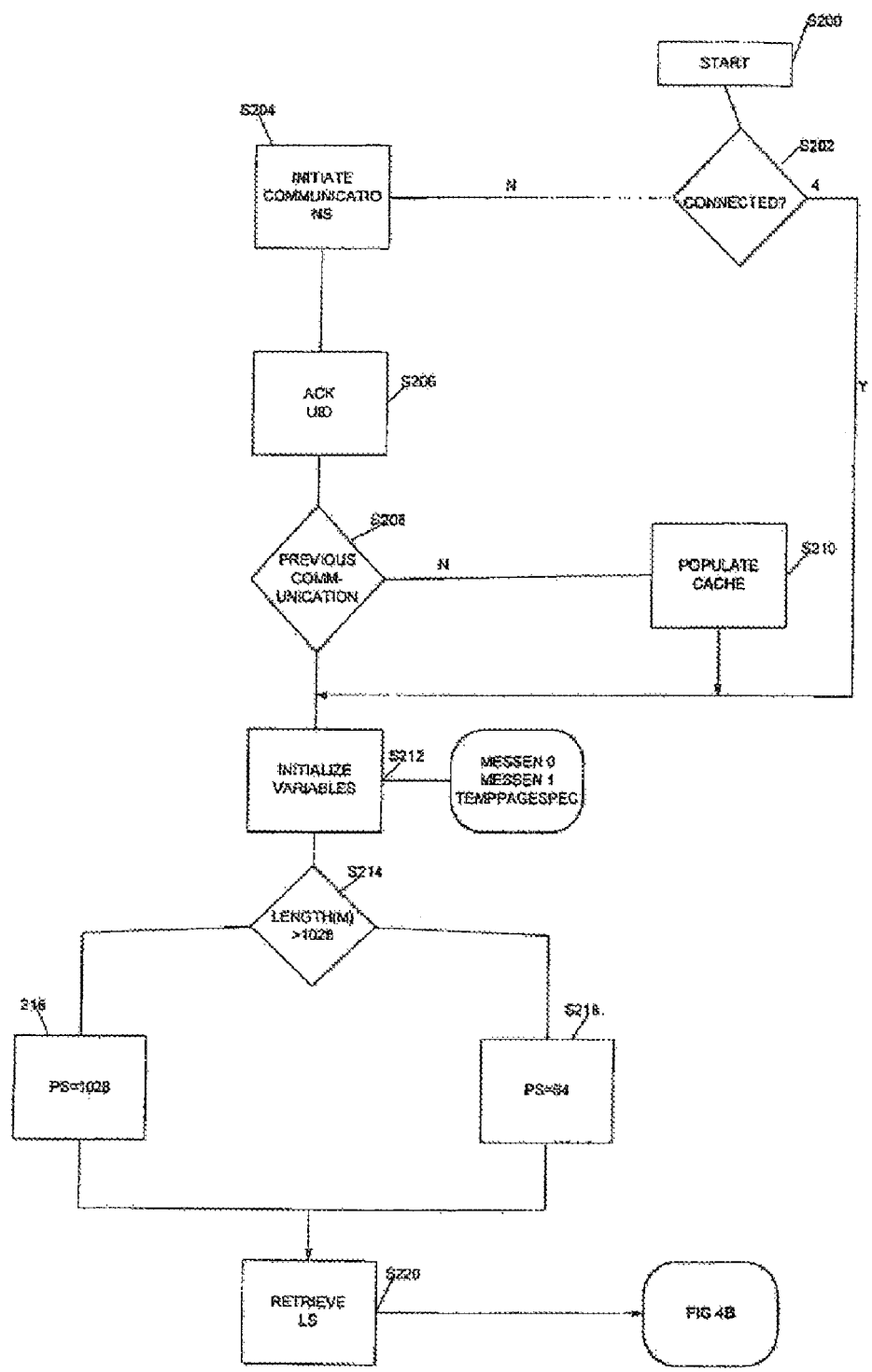
Figure 23:
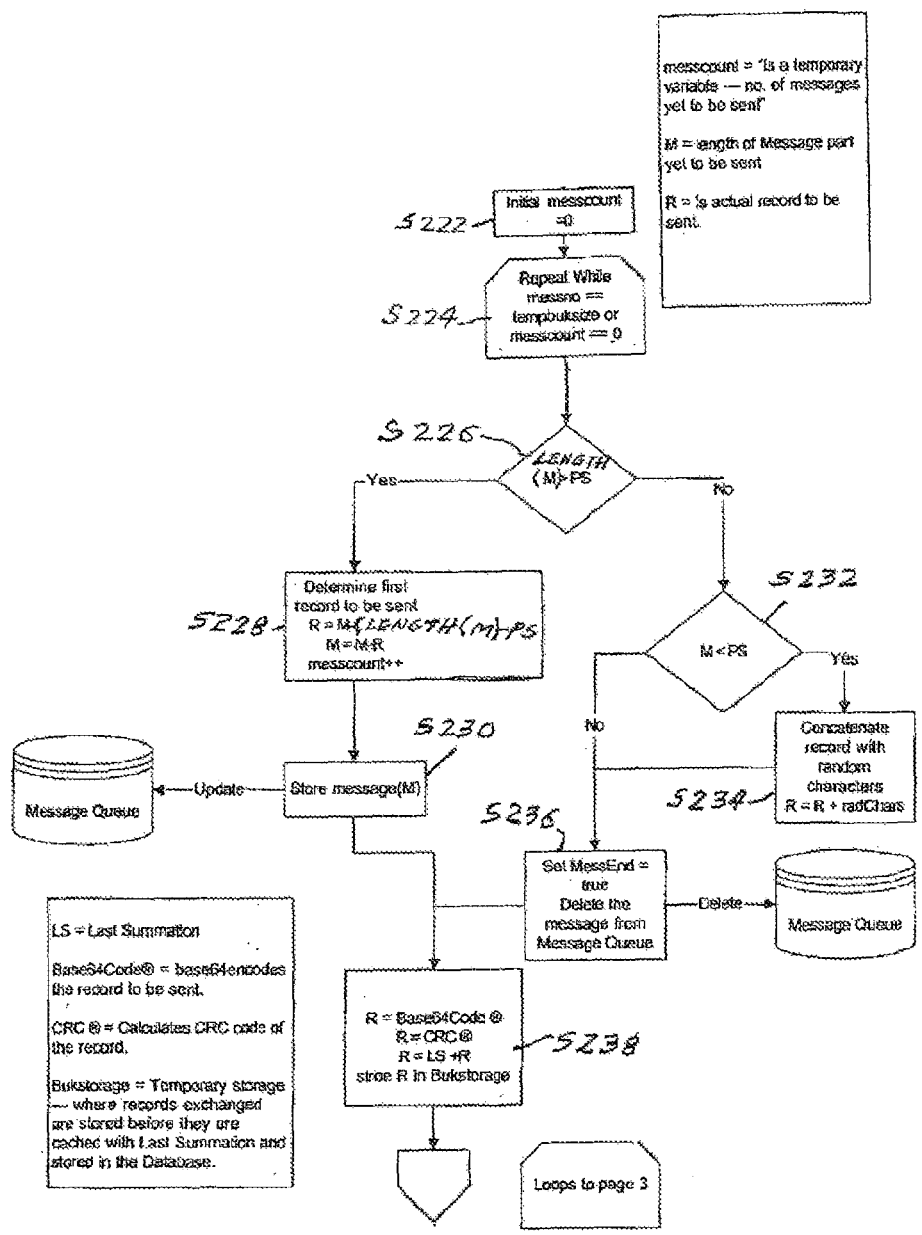
Figure 24:
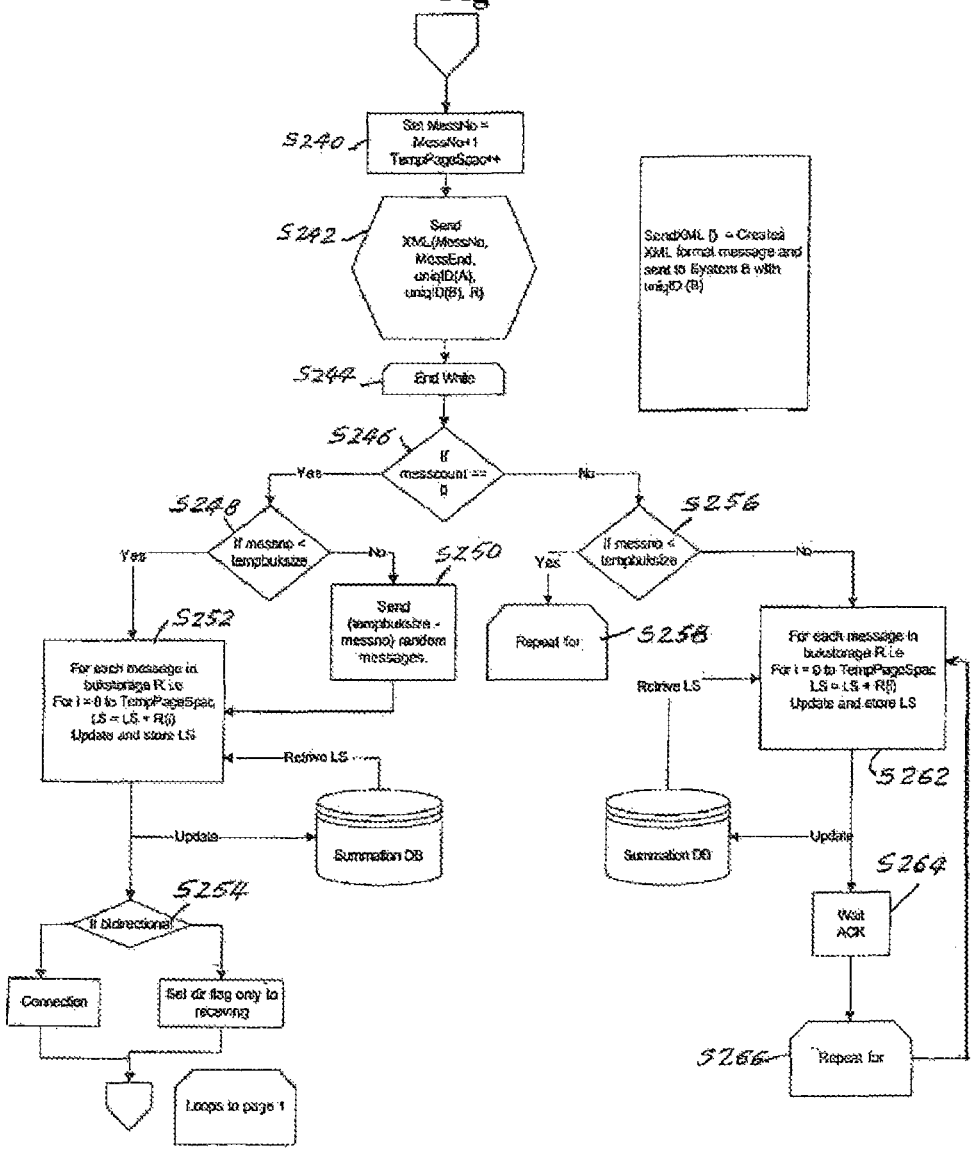
Figure 25:
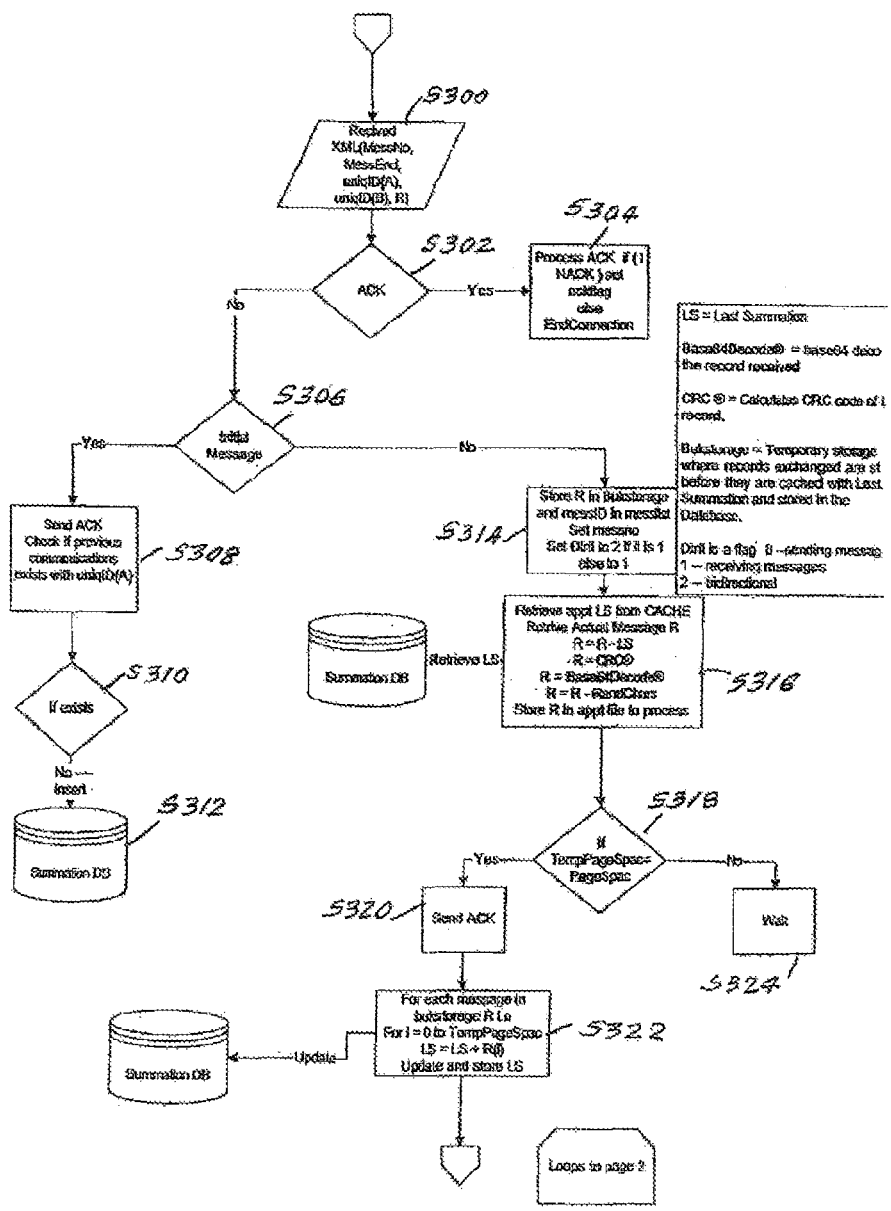

FIG. 19 is a diagram of a prior art security hardware arrangement;

FIG. 20 is a diagram of the security hardware arrangement of the present invention;

FIG. 21 is a high level flowchart showing the relationship of the modules of the present invention;

FIGS. 22-24 are detailed flowcharts depicting an example send process of the present invention; and FIG. 25 is a detailed flowchart of an example receive process of the present invention.

DETAILED DESCRIPTION OF THE INVENTION

The present invention provides an improved way to secure messages being transmitted between communicating devices, and an improved way to prevent the theft of such messages or the cloning of the devices. It also provides improved ways to assure authentication and message integrity, and prevent sender or receiver repudiation.

The invention may be implemented between any two devices on any platform in any programming language, with any operating system, either through software or hardware. It could even be used in limited fashion without computers where the arithmetic involved could be done manually on paper or manually on paper with the assistance of calculators or similar devices.

The two devices that are to communicate data must share identical versions of basic parameters including: at least one page size, an initial key or keys for each page size, and a security index (greater than one) representing the number of buckets or memory spaces to be filled with ciphertext before the key being used is updated. The page size, initial key, and security index must be the same on both devices.

If a message sought to be communicated between the two devices is larger than a page size, it would be broken down into a number of records, each of the page size.

The initial key may be a truly random file, a pseudorandom file, or an arbitrary file but it must be agreed upon between the devices. If the devices have communicated previously, they may reference the key or keys and other parameters used previously, and continue using them. If they have not communicated previously or the previously used key or keys and other parameters were not saved on both devices, they may use any method to exchange the key or keys and other parameters. For example, they could be shared via Public Key Infrastructure, via Diffie-Hellman or Diffie-Hellman-Merkle key exchange, via an interlock protocol, or using multiple channels to share subsets of the key. It could also be shared "in person" in a secure or obscure location. For example, a cordless phone base station and the handset could be programmed with a common key or keys and other parameters at the factory before being wrapped and sold or shipped. The key or keys and basic parameters may also be exchanged in plaintext, if necessary. If they are transmitted in a less than secure way, but are not intercepted, the key or keys will become secure over time using the present invention, as described below.

One or more page sizes must be selected such that they are the same on both devices. If only one page size is used, it would be used for all data communications. If messages of different sizes are common in the application for which the invention is being used, more than one page size may be arranged with one or more rules, formulas or agreed upon patterns. For example, each device could be programmed to use a small page size for the first x records and then a larger page size for all records after x. Or, for messages over a certain size, one page size could be used, but for messages smaller than that a smaller page size could be used. The page size used for any particular message or record must be the same on each device. Each page size would have its corresponding key or keys, since the keys and records all must be the same size as the page size.

The security index selected must be the same on each device. However, it is possible for the devices to each use a formula or an agreed pattern for the security index. For example, the devices could be programmed to use a small security index for the first x number of records processed, then a larger security index for pages processed after x.

Since each device performs the identical operations on the identical keys that they share, using identical parameters, the keys and parameters on each device remain in synchronization.

Identification strings such as Device Unique IDs (UIDs) or sessionIDs or lookupIDs may be used and stored by each device to recognize the other or to sort and index the stored parameters for different devices. Each device could associate the agreed parameters such as page sizes or rules, current keys and a security index or rules, with a UID, sessionID or lookupID. For example, on Device A, a database could be maintained of lookupIDs for many other devices. Given a particular lookupID for a Device B, Device A could search for the matching lookupID in its stored database and locate the parameters used for the previous communications between those two devices. During a particular communication, if no UID, sessionID or lookupID is available for any particular device, one could be created anew and associated with the necessary parameters as they are agreed upon between the two devices as discussed below.

In the first of the two stages in the present invention, each record of plaintext data to be processed is processed by modified addition, that is, adding it, character by character to the corresponding character in the key or keys to get a temporary result for each character position. If the temporary result would be longer in length than one character, then the base is subtracted from the temporary result, creating a resulting character no longer than one character in length. Another way of saying the same thing is that the most significant digit of the temporary result is omitted or dropped if the temporary result would be longer in length than one character. Typically, in a computerized system, this would be occurring using the computer's native binary code. And typically, the character would be one byte long. However, this process could also be used with base 256 ASCII, base 16 or hex code, base 10 or decimal code, or any other base number system. And the definition of a character could depend on the system used.

In a single key embodiment, each plaintext record would be added to the key in the modified addition method described herein, resulting in a block of ciphertext the same size as the original record—the page size. This process may be visualized as in FIG. 6. For example, the string 1001 1011 could be added to the string 1000 0011 to obtain the result 0001 1111 which has the same number of characters as the two other strings. Ordinary addition would produce the result 0000 0001 0001 1110 which has one additional byte because of the carrying to the left. The bitwise Exclusive Or operation (XOR) which is often used in encryption systems but is not in the present invention, would return the result 0001 1000. This modified form of addition, unlike XOR, works as well with more than two addends as is necessary in the multiple-key embodiment discussed below. Each record encrypted by this modified addition method would then be stored in a "bucket" of memory.

The present invention's modified addition method could be used via bits or bytes, or any other number system. In a preferred embodiment, the modified arithmetic described herein would operate on the byte level used by many programs and operating systems. For example, if the decimal character code for a particular byte of information is 155, the binary code would be 10011011. The decimal character code for another byte of information could be 131, and its binary code would be 10000011. Their ordinary sum would be 286 with a binary code of 1 0001 1110 encompassing more than one byte. Their bitwise XOR would be a decimal character code of 24 with a single byte binary code of 00011000. However, modified addition of the two characters would be the character code of 31 or the single byte of 00011111 in binary code.

Figure 10:
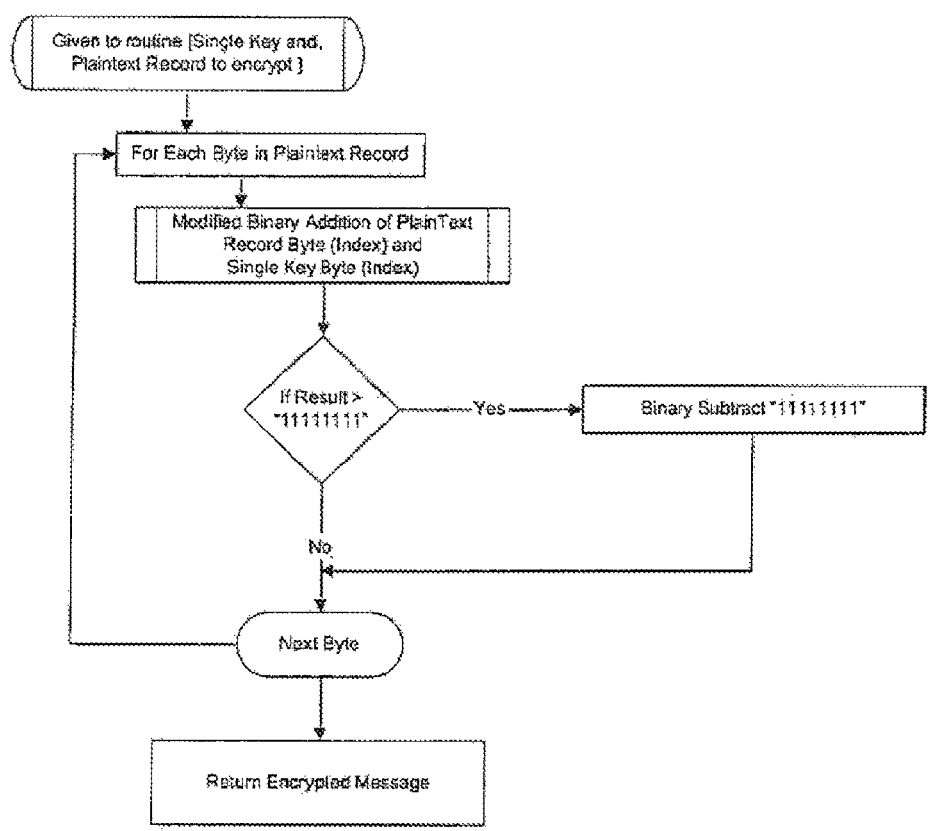
FIG. 10 (Single Key Encryption) portrays a single key embodiment of encryption according to the present invention.
Figure 11:
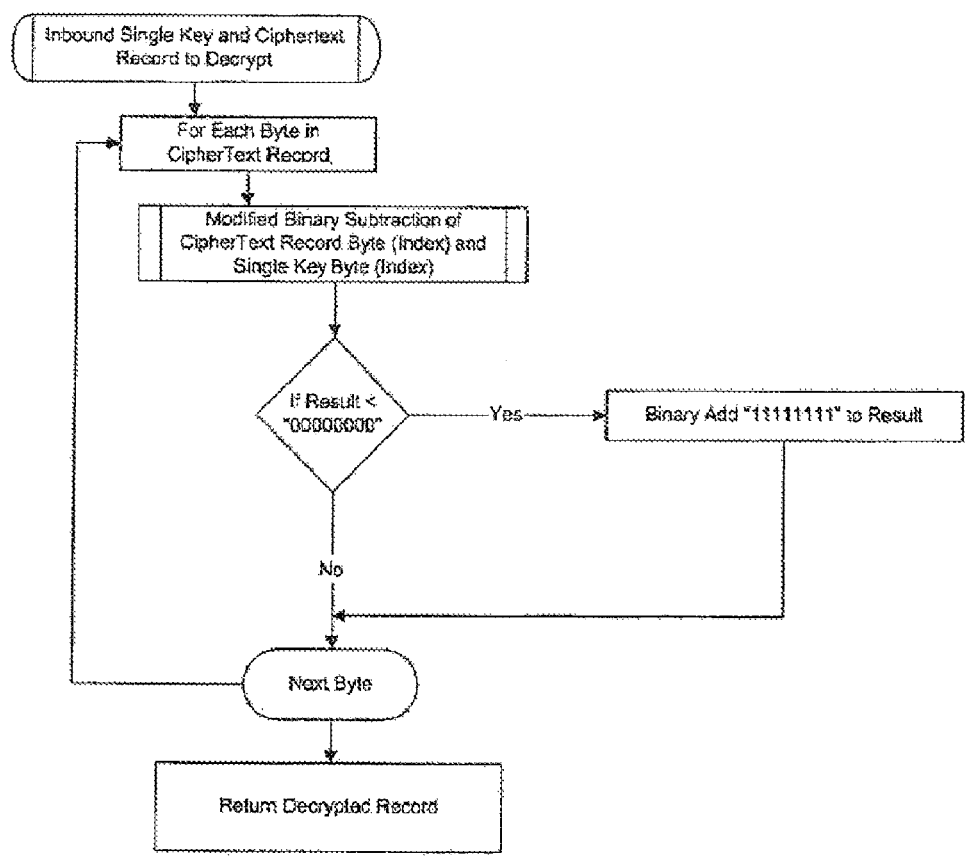
FIG. 11 (Single Key Decryption) portrays a single key embodiment of decryption according to the present invention.

The equation for stage 1 of this single key embodiment, shown in FIG. 10, would be:

Stage 1 (Modified Addition of the current key with the current plaintext record to create ciphertext for current bucket to be filled):

$$Cb = Pb \oplus Kc \text{ for each Pb until i buckets filled}$$

where:
Cb=ciphertext of a record
Pb=plaintext of a record
Kc=security cache or key
i=security index which must be >1
$\oplus$=modified addition process described herein This modified addition process repeats for each character in the plaintext record until there is a complete page of ciphertext corresponding to the page of plaintext and the same length as the page of plaintext.

Figure 14:
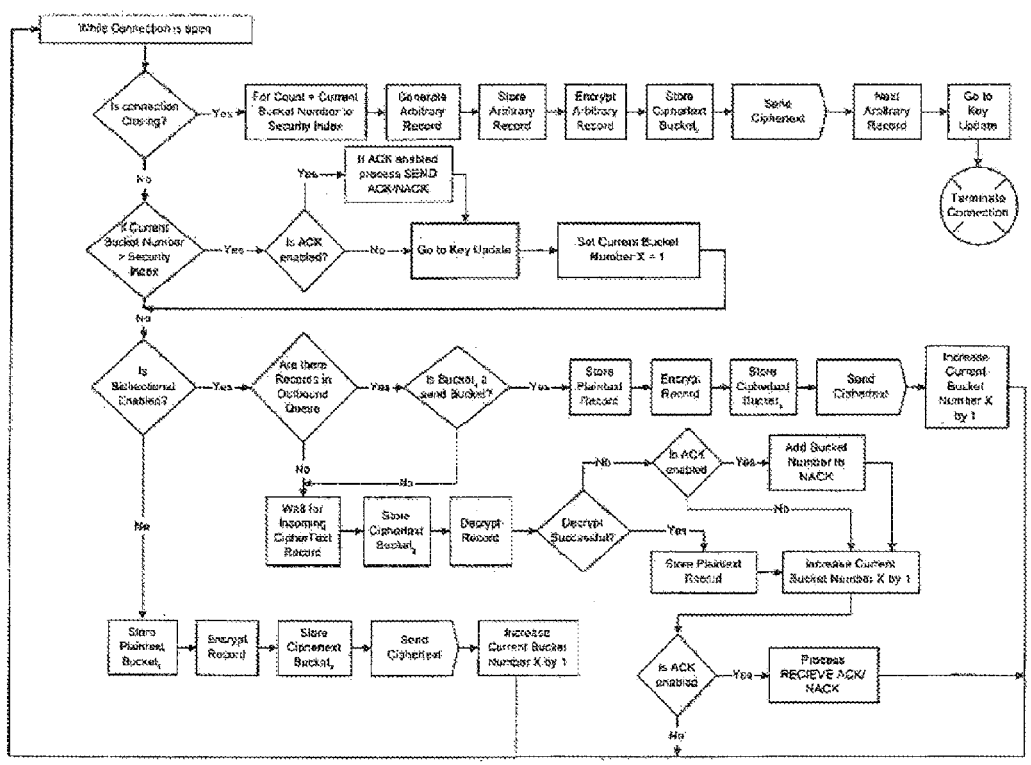
FIG. 14 (Message Loop) portrays a high level example of how a device using the present invention could process records.

Each page of ciphertext may be transmitted immediately to the other device or it may be stored for later transmission either by itself or in conjunction with other pages of data. In order for error checking to be performed, it would generally have to be before the security index was reached and the keys updated, as shown in FIG. 14. Any prior art error or error checking system to be invented could be used.

The present invention is structured such that other error-checking systems may be employed. For example, multiple ciphertexts records or messages may be sent, without an eavesdropper knowing that they are the same, if they are encrypted with different keys. Within the record, the addressing information or metadata could be configures so that the receiving device could compare them. If the data match, the receiving device could be assured that they were received correctly. If they did not match, the sending device could be instructed to resend.

Figure 17:
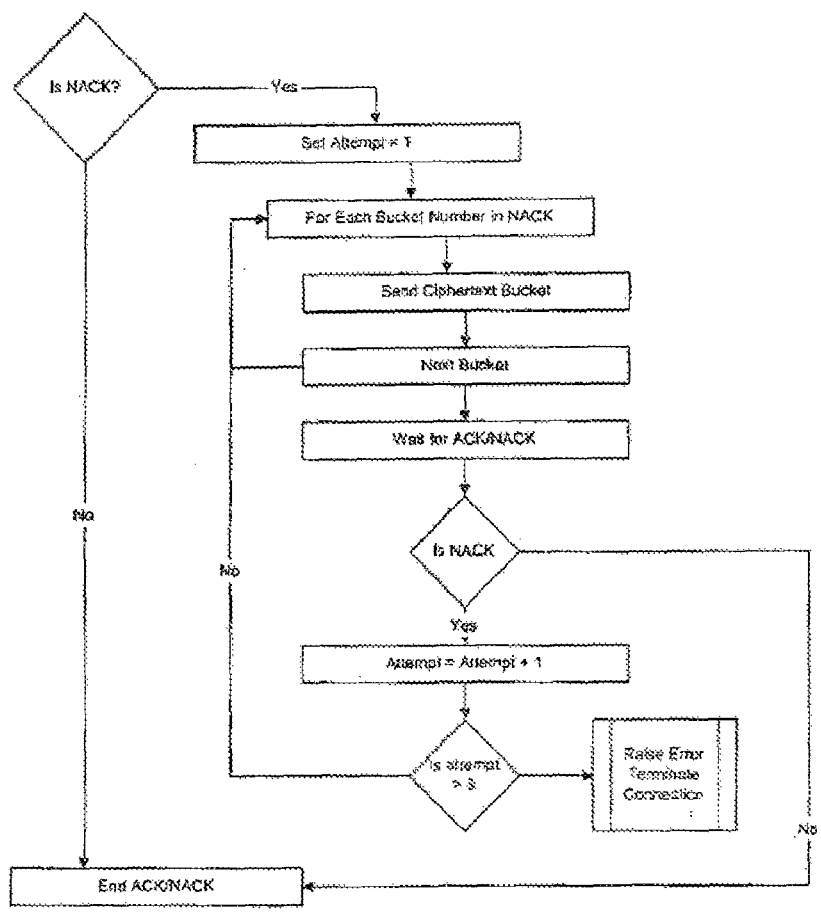
FIG. 17 (Send ACK/NACK) portrays a high level example of how error detection could be performed according to the present invention on the sending device.
Figure 18:
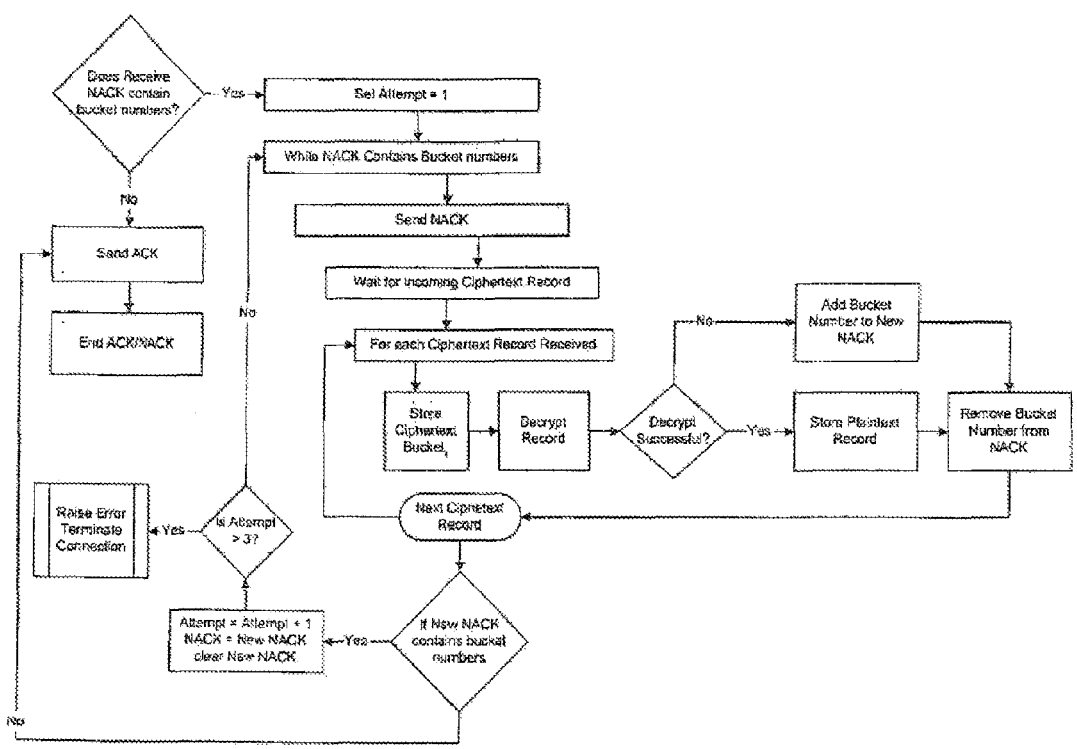
FIG. 18 (Receive ACK/NACK) portrays a high level example of how error detection could be performed according to the present invention on the receiving device.

Each record sent may be processed in any way for other purposes without interfering with the present invention as long as both devices are using the same processing for processes that change the plaintext or ciphertext. For example, in order to catch transmission errors, cyclic redundancy checks could be performed on the plaintext or ciphertext data or both. Acknowledgements or acknowledgement codes could be included or required, as shown in FIGS. 14, 17, and 18. For example, BASE64 encoding or decoding could be used on the ciphertext or the plaintext or both to ensure compatibility with other platforms, systems or protocols. For example, ciphertext or plaintext or both could be translated in hexadecimal format before or after being parsed into records to avoid null character strings which might be misinterpreted as terminating characters in a programming language such as C.

The process continues for each record of plaintext. Each page of ciphertext processed in this modified addition manner would be stored to a memory space known as a bucket. In the second of the two stages of encryption in the present invention, once the number of buckets filled with ciphertext equals the security index, the key or keys are updated.

Figure 12:
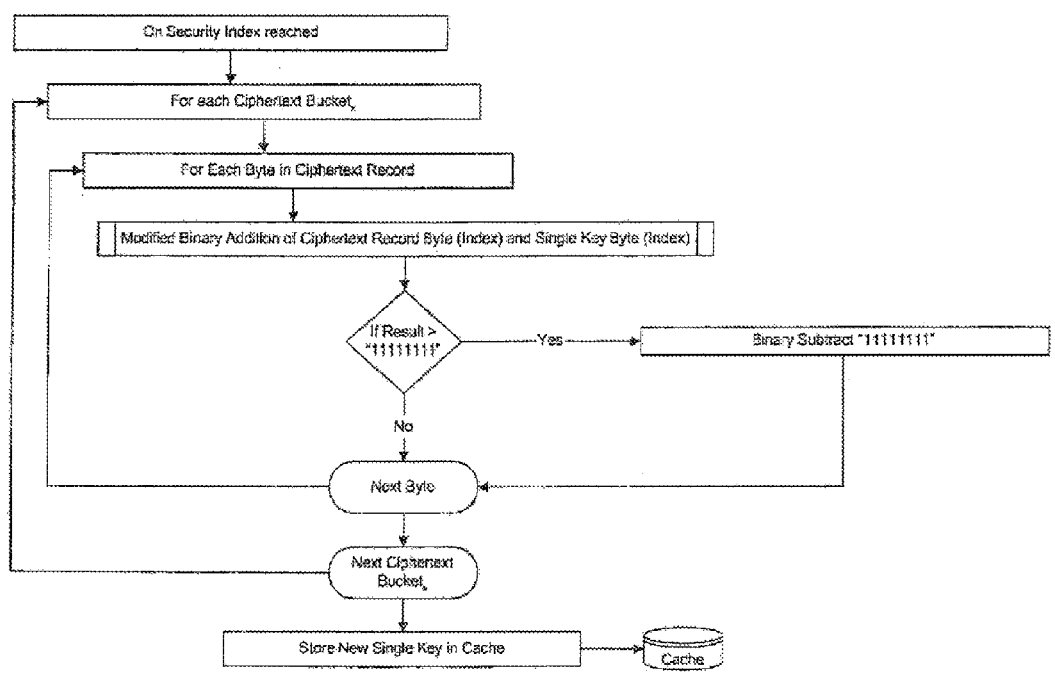
FIG. 12 (Single Key Update) portrays an example of how, in a single key embodiment, a device using the present invention could update the Key.

In the single key embodiment, as shown in FIG. 12, the key is updated by adding it in the modified addition method described herein to all the ciphertext buckets.

Stage 2 (updating of the security cache):

$$Kc = Kc - 1 \oplus \sum_{b=1}^{i} Cb$$

where:
Kc=newly updated security cache or key
Kc−1=prior security cache or key
i=security index
b=bucket number
Cb=ciphertext of a record corresponding to bucket number
⊕=modified addition process described herein.

Figure 6:
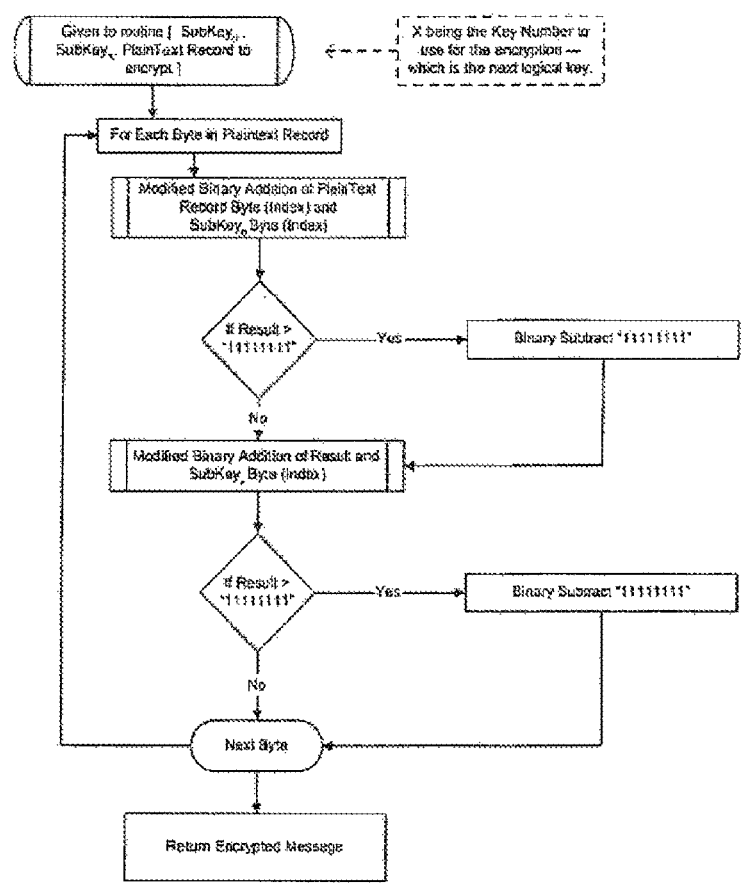
FIG. 6 (MultiKey Encryption) portrays a multi-key embodiment of encryption according to the present invention.

In the preferred multi-key embodiment, in the first stage, as shown in FIG. 6, rather than one key being used to encrypt all the records until the security index is reached and the key is updated, a different subkey, of the same page size as each record, is used to encrypt each record along with a master subkey, until the security index is reached and all the subkeys are updated. For example, if the security index is 3, then there would be 3 subkeys for the 3 records to be encrypted: SubKey1, SubKey2, and SubKey3. There would also be a master subkey or SubKey0. Record 1 would be encrypted with SubKey1 and Subkey0 to create Ciphertext 1 stored in Bucket 1. Record 2 would be encrypted with SubKey2 and Subkey 0 to create Ciphertext 2 stored in Bucket 2, and so forth.

The equation for stage 1 of the multi-key embodiment follows:
Stage 1:

Cb=Pb⊕SKb⊕SK0 for each Pb until i buckets filled where:
Cb=ciphertext of a record corresponding to bucket number
Pb=plaintext of a record corresponding to bucket number
SKb=SubKey corresponding to bucket number
SK0=SubKey0 or Master SubKey
i=security index
⊕=modified addition process described herein.

Figure 8:
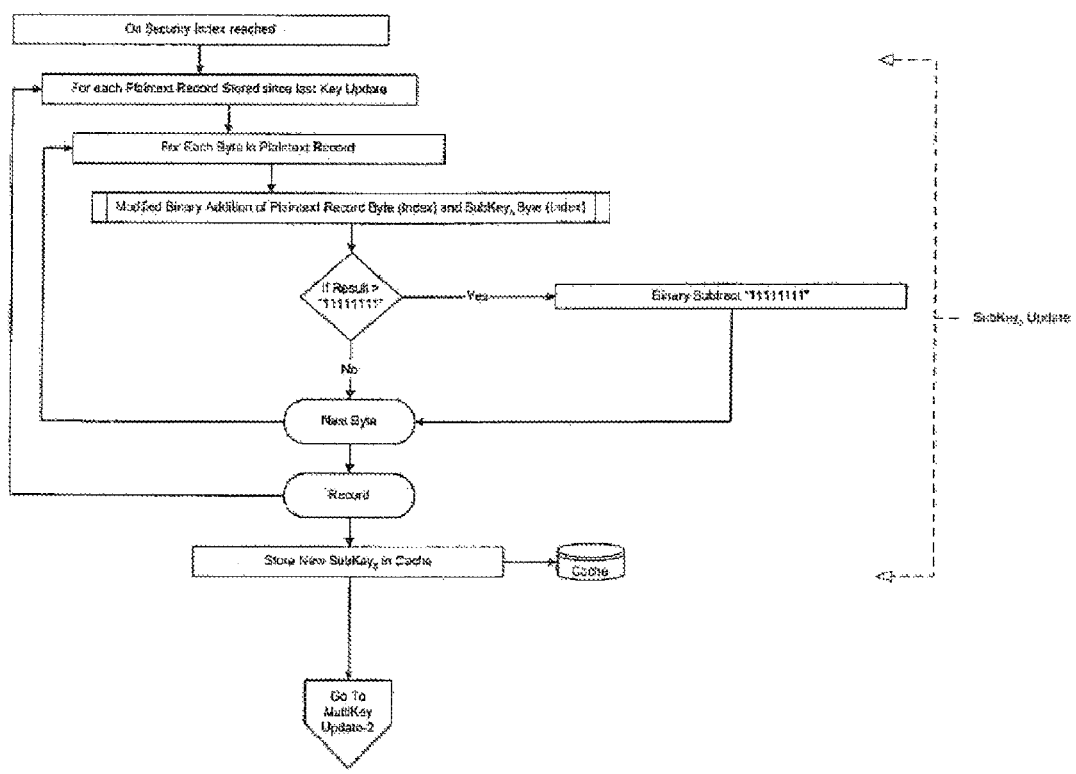
FIG. 8 (MultiKey Update) portrays an example of how, in a multi-key embodiment, a device using the present invention could update the MasterSubKey or $Subkey_0$.
Figure 9:
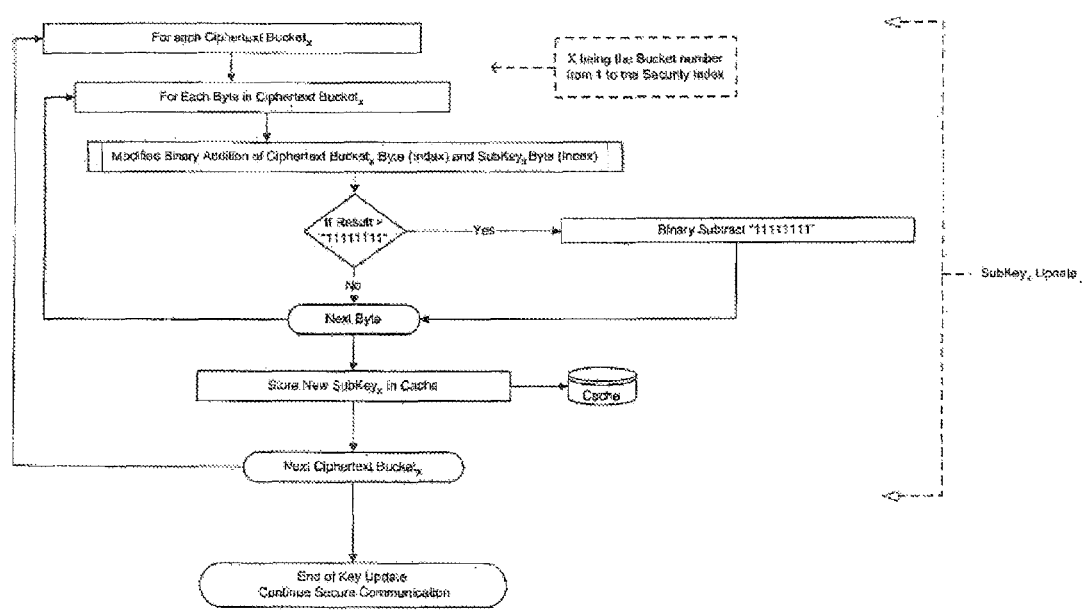
FIG. 9 (MultiKey Update (2)) portrays an example of how, in a multi-key embodiment, a device using the present invention could update the Subkeys other than the MasterSubKey.

In the second stage, when the security index was reached after Ciphertext 3 was stored in Bucket 3, all the subkeys would be updated as follows, in each case using the modified addition method described above: First, as shown in FIG. 8, the master subkey, SubKey$_0$ would be updated by adding it to all of the plaintext records up to the security index—in this example: all 3 plaintext records. The result would be a new SubKey$_0$, which would be used in updating all the other subkeys. Next, as shown in FIG. 9, Subkey$_1$ is updated by adding together, in the modified addition method described above, the ciphertext in bucket 1, and the new SubKey$_0$. The result is a new SubKey$_1$. Similarly, SubKey$_2$ is updated by adding together, in the modified addition method described above, the ciphertext in bucket 2, and the new SubKey$_0$. The result is a new SubKey$_2$. Optionally, the subkeys could also be updated with the MasterSubKey and plaintext data rather than ciphertext. The equations for stage 2 of the multi-key embodiment with ciphertext being used to update the subkeys follow:
Stage 2:
To update the Master SubKey or SubKey$_0$:

$$SK0 = \sum_{b=1}^{i} Rb \oplus SK0 - 1$$

or

SK0=SK0−1⊕R1⊕R2⊕ . . . ⊕Ri where:
SK0=new SubKey0 or Master SubKey
SK0−1=old SubKey0 or Master SubKey
R1=Record 1 plaintext
R2=Record 2 plaintext
Rb=Plaintext corresponding to Record b
i=security index
Ri=last R in security index
⊕=the modified addition method described herein.
To update the other SubKeys:

SKb=SK0⊕Cb where:
SKb=new SubKey corresponding to bucket b
SKo=new SubKey0
Cb=Ciphertext corresponding to bucket b In another embodiment, it would be possible in the multiple key embodiment, to add the plaintext records rather than adding the ciphertext buckets when updating the keys other than the MasterSubKey. In any embodiment, it would be possible to keep a running modified addition total of the plaintext records or the ciphertext buckets on the fly rather than storing them individually and then adding them later, at the update time.

Decryption follows the same pattern as encryption but in reverse, using modified subtraction instead of addition. For example, when a record of ciphertext is received by a device, the current key or appropriate subkey is subtracted character by character from the record of ciphertext in a modified manner in which if the subtrahend of the record is larger than the minuend of the key, the base of the number is added to minuend. For example, in base 2 or binary, if the subtrahend is 1 and the minuend is 0, the base of 2 or the binary number 10 is added to the minuend to create the binary equation 10−1=1. In a base 10 example, if the subtrahend is 7 and the minuend is 2, the base of 10 is added to the minuend and the resulting base 10 equation is 12−7=5. Note that when this modified subtraction process is used, there is no "borrowing" from other characters or digits to the left of the those being operated on. The number of characters started with always equals the number in the result.

In the single-key embodiment, for example, the string 10000011 (131) could be subtracted from the string 000111111 (31) and adding the base will result 10011011 (155) which has the same number of characters as the two other strings. Ordinary subtraction would produce the negative number 1110011100 (−100) with more characters because of the "borrowing" aspects of ordinary subtraction.

Figure 7:
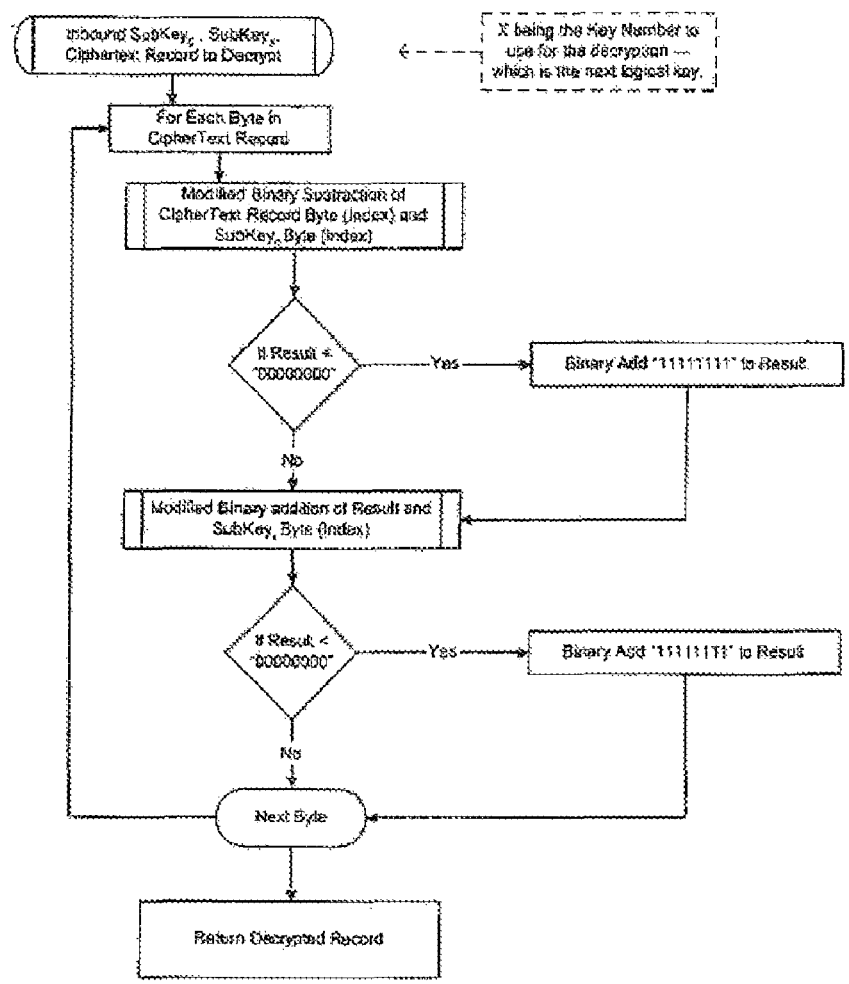
FIG. 7 (MultiKey Decryption) portrays a multi-key embodiment of decryption according to the present invention.

In the multi-key embodiment, as shown in FIG. 7, decryption can be a function of more than two numbers. The plaintext for a record b can be calculated from the ciphertext received minus the SubKeyb and minus the SubKey0, both being the modified subtraction method described herein. For example:

If PS=5 & Security Index=2 and
Initial SubKey1=11010
Initial SubKey2=11001
Initial SubKey0=10011
   First Record:
Ciphertext Rec'd=00011 (−)
Initial SubKey1=11010
Interim result=1$\overline{1001}$ (−)
Initial SubKey0=10011
Plaintext 1=0101$\overline{0}$ (decrypted)

In the multi-key embodiment, no two blocks of ciphertext would ever be encrypted with the same key or subkey, just as in the case of a one-time pad. For this reason, if the initial subkeys were random characters, and an attacker did not have access to the physical devices, but only the ciphertext, this embodiment of the present invention would be as unconditionally secure as a one-time pad. In addition, if initial key was not a random string, but rather pseudorandom or arbitrary data, it would become more random over time by its repeated encryption with the keys updated periodically via the modified addition method described above, similarly to the way a deck of standard playing cards that is not in a random order will become random after a certain number of shuffles.

In any embodiment, the updating of the keys proceeds identically on both devices.

Using this modified subtraction or modified addition, the resulting characters or digits are always the same length as the record which is the same length as the key. This length is always the page size. That would not be the case if ordinary addition or subtraction were used.

In this manner the content of the messages determine the evolution of the key or keys independently but identically on each device. Note that it does not matter how many records are processed in this modified addition manner, nor does it matter the order in which the modified addition is performed. The modified addition has the same commutative and associative properties as ordinary addition. Any number of addends may be added with this modified addition method. That would not be so, for example, if XOR were used.

In this way, content communicated between any two devices can be secured against man in the middle attacks. After the initial agreement on the key or keys, no key ever needs to be transferred to another device.

In addition, the ciphertext transmitted by the use of this invention is always the same size as the plaintext. Although it is encrypted, the encryption has not added any data to slow down the transmission of the ciphertext. In other words the speed of transmission of the ciphertext should be exactly the same as the speed of transmission of the plaintext would be.

In any embodiment, as soon as the new keys are created, all the buckets are emptied and the process can start again with the next record, if any. The ciphertext and/or plaintext may be stored or used elsewhere. Typically the ciphertext is transmitted to the communicating device.

Figure 3:
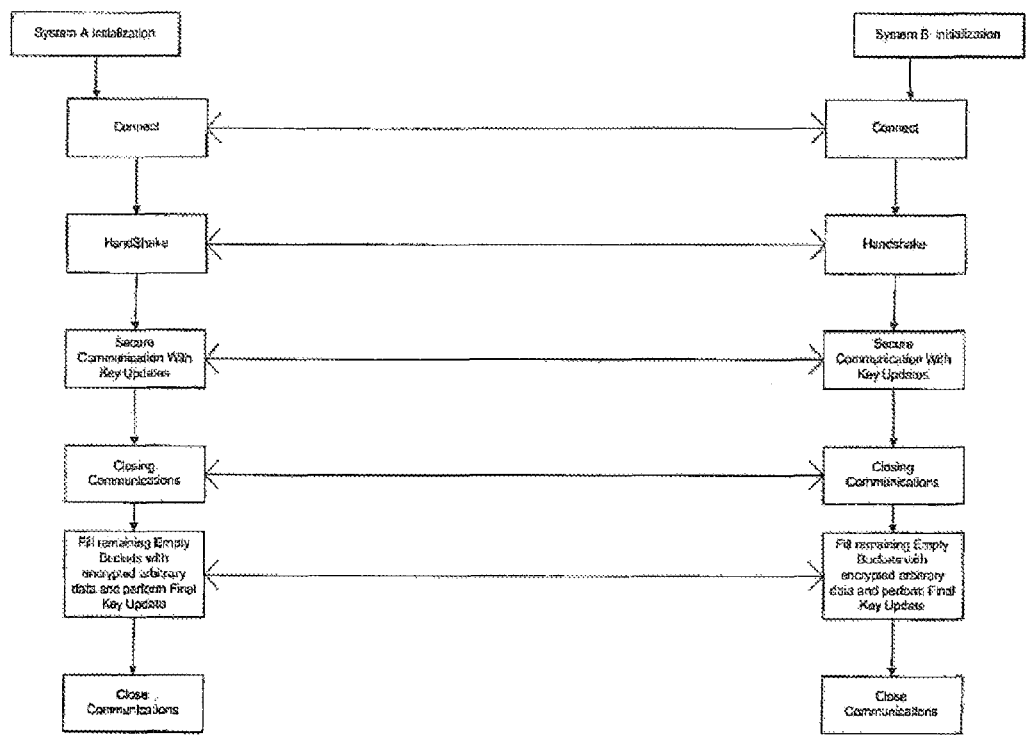
FIG. 3 (Overview) portrays an overview of one embodiment of communications between two devices disclosed by the present invention.
Figure 15:
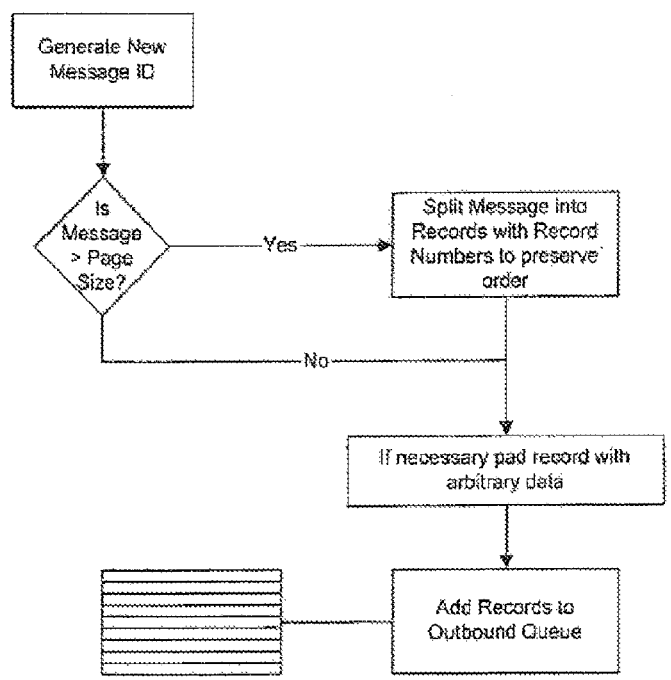
FIG. 15 (Send Message) portrays a high level example of how messages are parsed and if necessary padded with arbitrary data according to the present invention.
Figure 16:
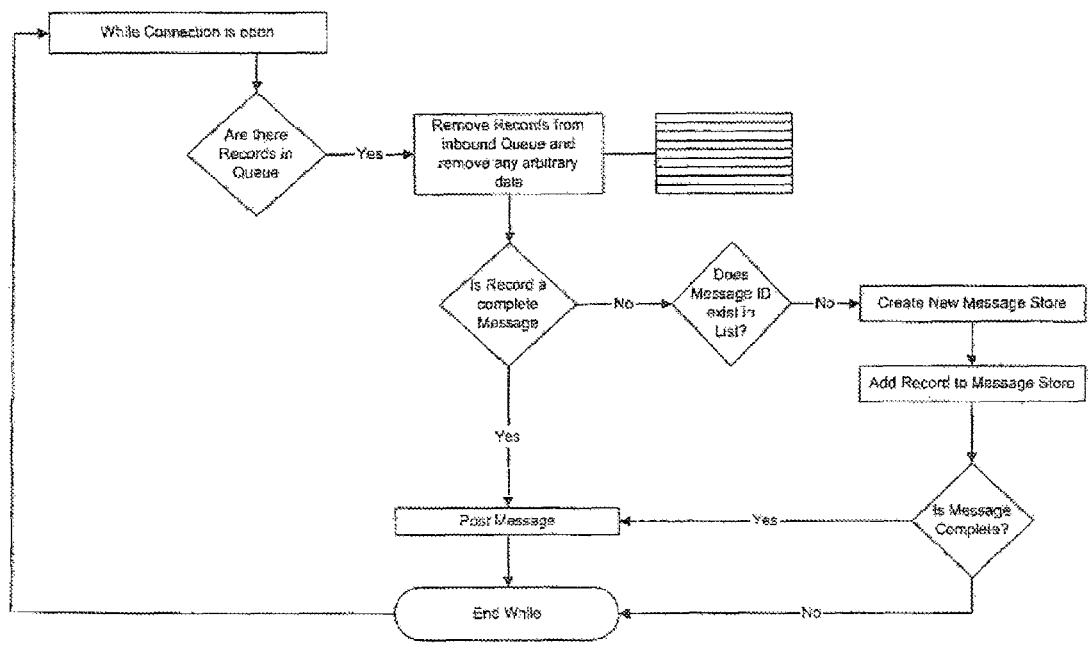
FIG. 16 (Receive Message) portrays a high level example of how records are received, and recompiled into messages according to the present invention.

Padding may be added if necessary to bring a record up to the page size, as shown in FIGS. 3 and 14, and 15. Entire records may be added from padding if necessary to bring the number of records up to the security index. The padding can be random data, pseudorandom data, or arbitrary data, but must either be agreed upon or there must be a system by which the receiving device can distinguish between padding and other data, as described by example below. This could include any other system's coding which can be added to the data or used to indicate the boundaries or delineation between data and padding. For example, if XML is used to envelope the non-padded record data, the XML codes within the record could bracket the real data leaving any data outside the brackets, anywhere within the record to be interpreted as padding. The brackets could include end (and/or beginning) of message indicators. The same would be true for multiple pairs of brackets, where for example, padding is followed by bracketed data, which is followed by more padding, which is followed by more data, etc. The padding may thus appear anywhere within a record or within a group of records as long as there is a way for the other device to know which data is padding and which is not. There is no other encryption method that can pad standard page size blocks with random characters where the position of the padding within the block is random, as described below. In this manner an eavesdropper or attacker would have no way of knowing which records contain padding or which portions of any record contain padding. This makes cryptanalysis more difficult.

The present invention may be used under or over any other encryption system, protocol or algorithm and in conjunction with any system, protocol or algorithm for authentication, ensuring non-repudiation or ensuring the integrity of the data communicated.

If the present invention is being applied to the prevention of piracy of certain data, for example a cable TV or satellite TV signal, it works in an analogous way. As the key or keys evolve on each device—one server or head-end device controlled by the cable or satellite TV company and one receiving device or TV set-top box or encryption module or point of deployment module at the site of the TV or customer—the communication between the two devices is secure and an exclusive dyadic relationship is formed. If one of the receiving devices is copied or cloned by one intent on pirating the signal, the communication between the server and only one receiver device will work. As soon as any data has been communicated (and, in some embodiments, the key or keys updated)

between the server and either of the customer devices, the other will be out of synch with the server. The result would be the server being able to detect the piracy and either the copied receiving device or the original receiving device not being able to access or decrypt the data stream. The security index could be set small enough such that the time period between updates of the key is short enough to frustrate any would-be signal pirate. The present invention can encrypt and secure all of the content or any portion of it, such as unique user account data.

Figure 1:
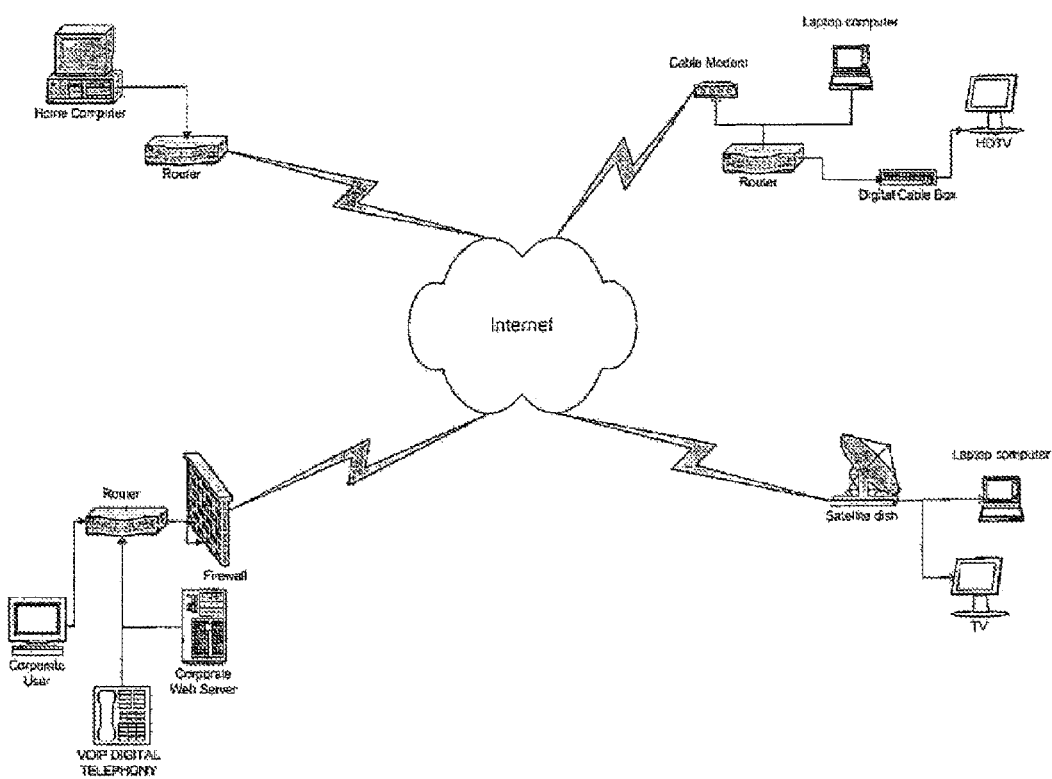
FIG. 1 (Applications) shows some typical prior art Internet connected devices and configurations which might use the present invention.
Figure 2:
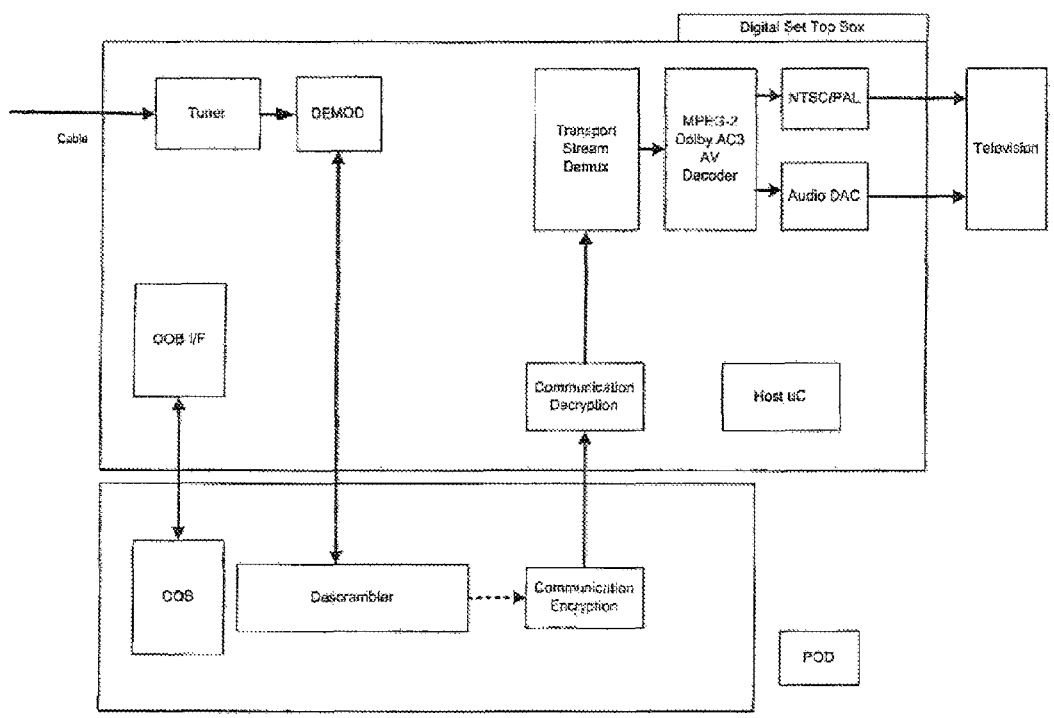
FIG. 2 (Cable TV Digital Box) shows a typical prior art Cable TV set-top box block diagram which could employ the present invention.

In FIG. 2, the present invention could be employed either from the Point of Deployment Module (POD) represented by the rectangle in the lower portion of the drawing, or from the digital set top box, or from both. It could also be incorporated directly into a television or any other signal reception device. In any case it would also be deployed in one or more nodes or servers on the other end of the communication channel.

It is also possible to encrypt a single data stream for example for each channel in a series of dyadic relationships between the head end and the first node, then separately between any number of nodes, then separately between the last of those nodes and the final node, and finally, separately between the final node and one or more client devices, computers or set-top boxes. In some cases this will mean that the loop between the final node and the client devices is the only one that needs to support multiple data streams for the different groups of channels or for different client devices. For example, each pair of devices along the chain from head-end or server to customer device might have its own encryption system, its own keys, its own page size and security index, etc. This embodiment simplifies the situation where the data signal is currently a one to many signal into a number of one to one signals.

Many systems that were at one time exclusively one-way technologies are now to some extent two-way technologies. For example, cable TV systems often permit set-top boxes or digital TV receivers to send signals to the head-end in addition to receiving content the other way. Any technology that is two way, can use the present invention. One-way technologies can only use it if there is a parallel source for communications in the other direction. For example, even if a satellite TV receiver can only receive signals as a one-way device, it may be connected to a phone line which connects it to a computer linked to the satellite upfeed servers to complete the two-way service.

The security system of the present invention enables the use of a single IP address and communication port (referred to herein as a "socket") connection between sender and receiver devices, and all messages and records sent between the respective devices can be transmitted thereon. This represents a significant improvement over prior art security systems that require different sockets to be opened and closed for each message being transmitted.

For example, in the prior art, when a user establishes a connection with a web page that comprises multiple objects (e.g., images, sounds, exterior page text, or the like) using web browser software, a communication and data session is established between the server and the browser software. Through this session, multiple sockets are opened in order to retrieve the multiple objects. If the user is connected to a secure web site, the security is maintained in all of the socket connections during the communication and data session until the session between the browser and the web server ends, for example by the web browser or server terminating the session, inactivity resulting in a "time out," or until the user establishes a connection to an otherwise unsecured web site. In such case where the browser attempts to connect to an unsecured web site during an active and secured session, a message is preferably displayed indicating that secure and non-secure items are being downloaded simultaneously.

Figure 13:
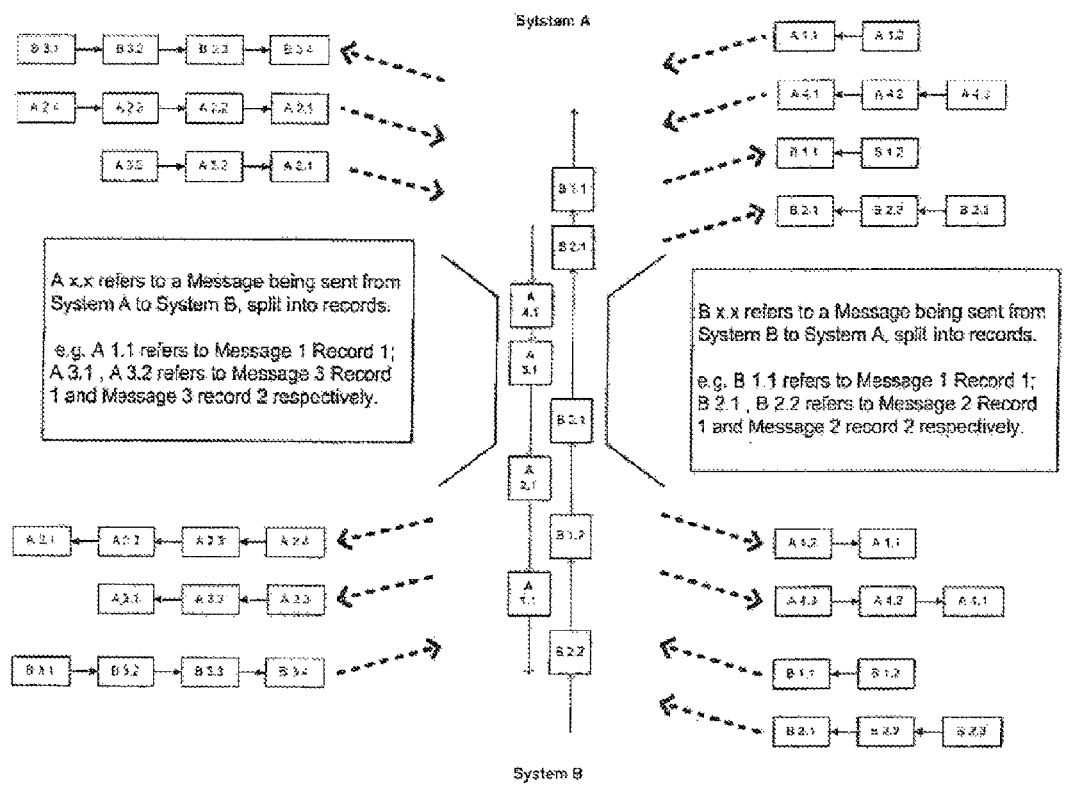
FIG. 13 (Message Stream Overview) portrays an overview of one example of what the pipeline of records being communicated between two devices could include, including the multi-document, interleaving, and bidirectionality aspects of the present invention.

In accordance with the present invention, all encrypted records and messages may be transmitted between two devices over a single communication socket, as shown in FIG. 13. This is accomplished by the security modules employed on the respective devices. Specifically, each record or message that is transmitted between the devices, in either direction, during a single communication session may be encrypted over the same socket. To an eavesdropper, the identical sized records do not reveal which message or document they are part of, what order they belong in, or how long are the messages they compose.

In another embodiment, applicable to either single single-key or multi-key embodiments, but particularly useful for multi-key embodiments, it is possible to use the present invention such that each device contains more than one data cache. For example Device A could have a data cache that it uses to send messages and documents, while Device B has a different data cache that it is using, perhaps even over the same communication socket, to send its data stream. Device A would keep Device B's data cache to decrypt Device B's data stream. And Device B would keep Device A's data cache to decrypt Device A's messages and documents. Where, for example, the devices are transmitting very different kinds or quantities of data, this would be more efficient than a single data cache. For example, a content server or head-end might transmit large amounts of video data to customer devices while those customer devices transmit only very small amounts of accounting or program choice data to the head-end.

The multi-document aspect of the present invention also permits the communication of several different messages such that records from each are sent in such a way that an eavesdropper would not know which records belong to which messages, as shown in FIG. 13. For example, Device A has 3 messages to send and labels them Message 1 (parsed into 4 records), Message 2 (parsed into 5 records), and Message 3 (parsed into 10 records). Record 1 may be from Message 1, but Records 2 through 5 may be from Message 2, while Records 6 through 10 are from Message 3, and so forth. FIG. 8 (Message Stream Overview) demonstrates this feature of the present invention in its portrayal of different records, comprising different messages, traveling in both directions between two devices.

In addition, because the present invention can function bidirectionally, some of the messages could be coming from Device A to Device B while some are going in the other direction, as shown in FIG. 13. The addresses that can be included with each record would determine to which message any particular record belongs. For example, each record could be addressed with the Message Number and the Record Number within that message: e.g. Message 2/Record 3 (the third record of the second message) or Message 3/Record 1 (the first record of the third message). This would also permit records to be transmitted out of order and re-ordered properly by the receiving device after receipt. Since the entire stream of records is generally traveling over the same socket with each record being the same size, to a man in the middle there would be no way to distinguish one message or document from another or tell which records or data were beginnings, middles or ends. Each of the multi-document, bidirectional, and variable order aspects of the invention increases overall security and makes cryptanalysis more difficult.

Because of the limited number of operations necessary for this invention, and because those operations involve only simple, core computer functions such as addition, subtraction, truncation, storage to memory and calls from memory, it is extremely fast in operation whether configured through software or hardware. The present invention involves none of the complex one way functions of many algorithms or systems of encryption or decryption, nor does it use any:

Prime numbers or relatively prime numbers
Factorials
Logarithms
Division modulus operations
Squares or Square Roots, Cubes or Cube Roots, n-exponents or n-roots
Greatest common divisors
S-boxes
Inverses (eg. multiplicative inverse of 4 is ¼)
XOR or Exclusive Or operations
Quadratics or quadratic residues
Polynomials or polynomial residues
Legendre, Jacobi symbols or Blum Integers
Galois fields None of the features of the invention needs to remain a secret in order for the invention to be useful for its intended purposes. An eavesdropper could know all aspects and features of the invention, and in fact could have an executable version of all of the code, and could know all the parameters except the initial key, and would still not be able to cryptanalyze the ciphertext to recreate either the key or the plaintext.

Figure 4:
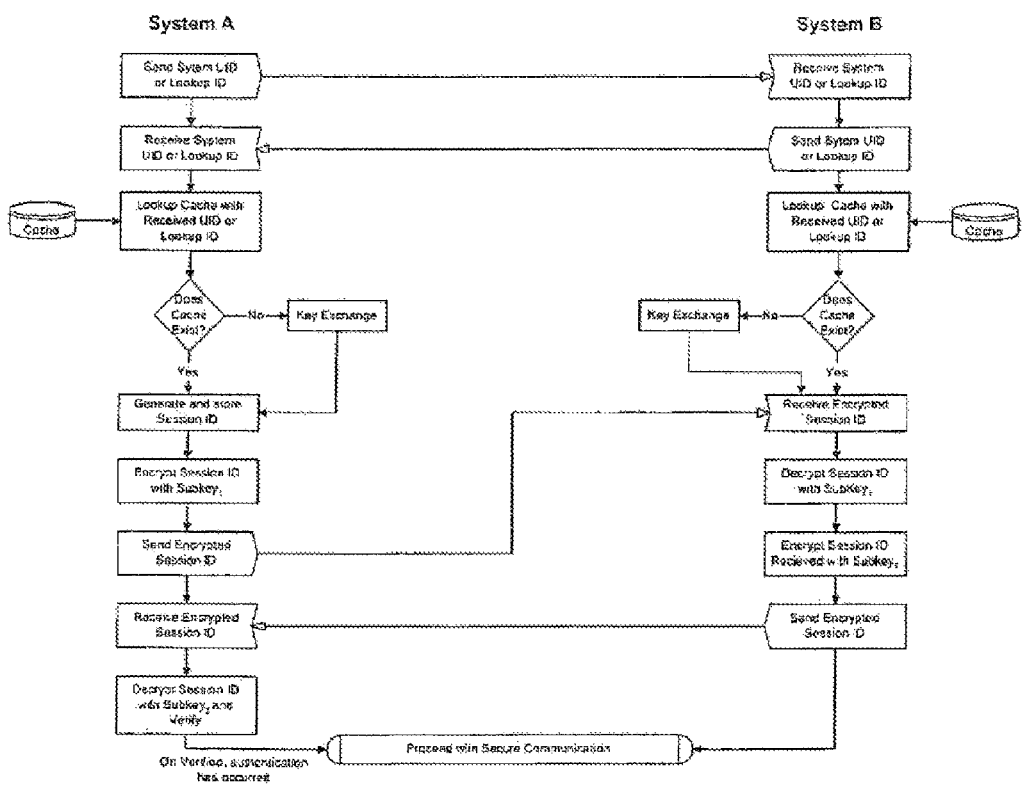
FIG. 4 (Handshake) portrays an example of how two devices could agree on parameters, including keys, sessionID, for secure communications according to the present invention FIG. 5 (Key Exchange) portrays an example of how two devices could exchange keys in the event they had never communicated before or no longer had available the data caches from their previous communications.

In addition to preserving the confidentiality of messages, this present invention can also be used in myriad ways to ensure device and personal authentication, data integrity and non-repudiation, one of which is shown in FIG. 4. For example, if Device A sends a document in x records to Device B, and after it's completely sent, Device B continues to communicate effectively back to Device A, that proves that Device B must have received the data exactly as Device A sent it. If not, their keys would be different and they would not be able to communicate. Included in the records sent and received can be timestamps, digital signatures, hashes of documents, and many other building blocks for authentication, data integrity and non-repudiation. The present invention therefore provides the basic conditions which facilitate most previously known protocols for assuring confidentiality, personal and device authentication, data integrity, and non-repudiation.

A protocol for initial authentication can serve as an example and also elucidate the workings of the present invention.

In order to initiate a secure communication, Device A sends a request to Device B along with Device A's lookupID. Device B accepts Device A's request and sends Device B's lookupID. If the devices find each other's lookupIDs in their databases or data storage, they will each have access to the accompanying parameters stored therewith: the key or keys, page size (s) or page size rules, and the security index(es) or security index rules used previously in their communications. In the multi-key embodiment discussed above, Device A can now generate a new sessionID and encrypt it as a record 1 with SubKey1 and optionally SubKey0 from their previous communications and send it to Device B. Device B can decrypt it with the same subkey or subkeys. Device B can encrypt the same sessionID as record 2 with the SubKey 2 and optionally SubKey0 and send it to Device A. Device A could decrypt it with SubKey 2 and optionally SubKey0. If A can match the sessionIDs, it confirms that Devices A and B have authenticated each other and can communicate securely. They can also securely update their lookupIDs so that the subsequent time they attempt to communicate they can use the same protocol.

In the single-key embodiment, if the devices find each other's lookupIDs, Device A can encrypt a new sessionID with the key used by the two devices previously and send it to Device B. Device A can then update the key with the plaintext record, or optionally the ciphertext bucket, just sent. Device B can decrypt the sessionID with the previously used key, and then update its key with the plaintext record, or optionally the ciphertext bucket, just received. Then Device B can return to Device A the sessionID after encrypting it with the updated key. If Device A can decrypt it with the updated key and match the sessionID received to the one it sent, then it confirms that Devices A and B have authenticated each other and can communicate securely. They can also securely update their lookupIDs so that the subsequent time they attempt to communicate they can use the same protocol.

In both embodiments, the sessionID is likely to be shorter than the page size so the devices would have to pad the records in which they are sending the new sessionIDs. As above, if they can continue to communicate securely and properly maintain the synchronization of the present invention, it confirms not only their device authentication to each other but also the integrity of the data stream. If they properly include in their communication, digital signatures, timestamps, hashed and signed documents, and other standard techniques of encryption, they can assure themselves of personal authentication and non-repudiation as well.

In the even that either or both Device A and Device B cannot find the other's lookupID in their data storage, or if they have never communicated previously, then they must initialize use of the present invention in order to communicate securely.

Figure 5:
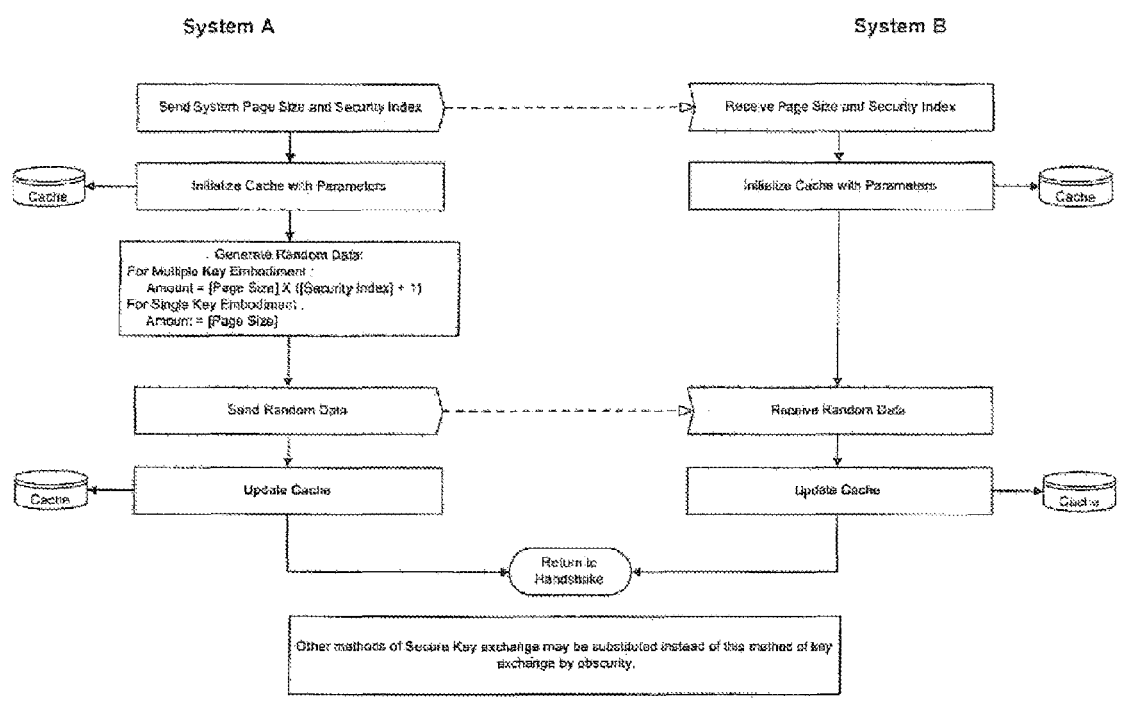

They may do so either by using another method of securely exchanging the key or keys, page size or page size rules, and security index or security index rules that are the minimum requirements for use of the present invention. They may do so via any key exchange protocol available, such as Diffie-Hellman or Diffie-Hellman-Merkle key exchange, or a secure interlock protocol, or public key infrastructure, or via a trusted intermediary, or via a Virtual Private Network, or via splitting the key across multiple channels, or in obscurity, as shown in FIG. 5. Alternatively, they can exchange the required parameters in the open and rely on the tendency of the present invention towards increasing security through use, as the initial insecure keys become more and more random over time. Once they have exchanged a key or keys, the process proceeds as above in either the single key or multiple key embodiment.

It is important to note that the present invention does not inhibit or restrict other security mechanisms or load balancing mechanisms that may be in place over communication networks. Provided the present invention is installed on the respective sending and receiving devices, the encoding and decoding mechanisms described above can be employed without affecting the platforms on which the mechanisms operate.

Where there are large networks of users each of whom must communicate with many others or every other, the memory storage requirements of a dyadic system became significant. However, in another embodiment, it is possible to design the communication pathways such that each user is communicating only with 1 or a small number of other devices, called routers or switches or servers. For example, rather than having 1000 devices each communicate with every other requiring each device to have 1000×1000 or a million memory storage spaces or a total of 1000×million or a billion memory storage spaced overall, each device could communicate only with a router, which itself has 1000 memory storage spaces for an overall total of only 2000 (1000 on the router and 1 on each of 1000 devices). If the memory storage requirements on 1 router became too significant, there may also be a number of routers which communicate among themselves further reducing the requirements on any one router. In this way, a dyadic encryption system such as the present invention can work as well on a large network of users each of whom needs to communicate with many others or every other on the network. Another example might be a cellular telephone network where each phone is encrypted to one or more servers at its host company each of which is encrypted to one or more servers at other cellular host companies allowing all customers of all participating host companies to enjoy encrypted communications although each phone only needs to have one memory storage space.

In another embodiment of the present invention, the UIDs that are exchanged could be exchanged as part of the encrypted communications, or could be encrypted via another encryption method, or a hash of the two UIDs or the two UID in addition to the last security cache or last bucket or a subkey could be exchanged to prevent an eavesdropper or attacker from spoofing or interfering with an UID.

If more than 2 devices are communicating using the present invention, another embodiment is for each device that is sending, to broadcast to the entire group such that every device that is a member of the group can synchronize the key or keys and any other parameters opted for. In addition to a message number and other parameters discussed herein, the records or transmissions could also include a "To" field and/or a "From" field, and all other devices would be effectively "copied" on the message. It would be necessary to create a system by which each device in the group receives the same transmissions in the same order, even if they originated with different devices. This could be done by with timestamps, a turn-taking system, or any other method to order the processing of records synchronistically.

Each embodiment of the present invention works with each and every other embodiment.

Although the present invention has been described in relation to particular embodiments thereof, many other variations and modifications and other uses will become apparent to those skilled in the art. Therefore, the present invention should not be limited by the specific disclosure herein.

What is claimed is:

1. A method of encrypting a multi-digit plaintext string of multi-bit digits stored on a sending computer device using at least one multi-digit encryption key having a plurality of multibit encryption key digits, comprising:
    (a) on the sending computer device, adding one multi-bit digit of said plaintext string to a corresponding multi-bit digit of the at least one multi-digit encryption key to produce at least one ciphertext result digit;
    (b) on the sending computer device, truncating the most significant digit of the at least one ciphertext digit if the at least one ciphertext result digit is longer than one digit;
    (c) storing the at least one ciphertext result digit on the sending computer device; and
    (d) repeating steps (a) and (b) and (c) for the next multibit digit in the plaintext string until the end of the plaintext string is reached,
    wherein the encryption of the plaintext becomes more secure as the amount of plaintext which is encrypted increases.

2. The method of claim 1, further comprising:
    prior to (b), as part of producing the at least one ciphertext result digit, adding a corresponding digit of a second encryption key.

3. The method of claim 1, where the encryption is performed without the use of an encryption table.

4. A method of updating an encrypting key stored on a computer device, the key being formed of a plurality of multi-bit digits, comprising:
    (a) on the computer device, adding one digit of said key to a corresponding digit of a cipher text data string data string stored on the computer device to produce at least one key update result digit;
    (b) on the computer device, truncating the most significant digit of the at least one key update result if the at least one key update result digit is longer that one digit;
    (c) storing the key update result digit on the computer device in place of the one digit of said key;
    (d) repeating steps (a) through (c) for the next digit in the key until the end of the key is reached,
    wherein the digits of the encryption key do not repeat periodically as the key is updated.

5. The method of claim 4, further comprising:
    prior to (b), as part of producing the at least one key update result digit, adding at least one digit of another data string to the at least one one digit of said key.

6. The method of claim 4, where the encryption is performed without the use of an encryption table.

7. A method for securing data communicated between at least two devices, comprising:
    (a) receiving an initial multi-character MasterSubKey of data of a certain page size at each of a first device and a second device;
    (b) receiving a shared security index for use at both the first device and at the second device;
    (c) receiving a plurality of initial multi-character subkeys of data at the first and second devices, the number of multi-character subkeys being equal to the security index, each multi-character subkey having a size equal to the page size;
    (d) extracting a first page of plaintext data from a message at the first device, the page of plaintext data containing a plurality of multibit characters, each character being represented by a string of digits;
    (e) performing a modified addition operation on the first page of plaintext data and the first initial subkey, where the modified addition operation includes adding each character from the page of plaintext data to its corresponding character in the first initial subkey and then dropping the most significant digit of the result, on a character-by-character basis, if the result for any character is longer in length than one character;
    (f) storing the resulting page of data to a first ciphertext bucket of memory space at the first device;
    (g) transferring the first page of data from the first device to the second device;
    (h) performing a modified addition operation on the next page of plaintext data of the page size from the message and the next initial subkey to create a next page of ciphertext data, where the modified addition operation includes adding each character from the next page of plaintext data to its corresponding character in the next initial subkey and then dropping the most significant digit of the result, on a character-by-character basis, if the result for any character is longer in length than one character, storing the resulting next page of ciphertext data to a next ciphertext bucket, and transferring the resulting next page of ciphertext data from the first device to the second device;

(i) repeating step (h) on all subsequent pages of plaintext data extracted from the message and subsequent initial subkeys and storing each resulting page of ciphertext to a next ciphertext bucket at the first device, and transferring the resulting page of ciphertext from the first device to the second device, until the number of ciphertext buckets filled equals the security index;

(j) when the number of ciphertext buckets filled on either the first or second device equals the security index, performing at that device a modified addition operation on each initial subkey, its corresponding plaintext data, and the MasterSubKey, where the modified addition operation includes adding each character from the initial subkey to its corresponding character in the corresponding plaintext data and the MasterSubKey and then dropping the most significant digit of the result if the result is longer in length than one character, and storing the resulting page as a new subkey to replace the initial subkey on that device;

(k) repeating step (j) until all initial subkeys have been replaced (l) repeating steps (d) through (k) using the replaced subkeys until all plaintext data has been processed and transferred to the second device.

8. The method of claim 7, wherein the modified addition operation in (e) further includes, prior to the truncation, adding to each character from the page of plaintext data its corresponding character from the multi-character MasterSubkey.

9. The method of claim 8, where the encryption is performed without the use of an encryption table.

10. The method of claim 7, wherein the modified addition operation in (h) further includes, prior to the truncation, adding to each character from the page of plaintext data its corresponding character from the multi-character MasterSubkey.

11. The method of claim 10, where the encryption is performed without the use of an encryption table.

12. The method of claim 7, further comprising:

as part of (j), updating the multi-character MasterSubKey by performing at that device a modified addition operation on each character in the MasterSubKey by adding to each character in the MasterSubKey each corresponding character in at least one of the ciphertext buckets of data to produce a new MasterSubKey result character, dropping the most significant digit of the MasterSubKey result character if the MasterSubKey result is longer in length than one character, and replacing the corresponding character in the MasterSubKey by the MasterSubKey result.

13. The method of claim 12, where the encryption is performed without the use of an encryption table.

14. The method of claim 7, further comprising:

as part of (j), updating the multi-character MasterSubKey by performing at that device a modified addition operation on each character in MasterSubKey by adding to each character in the MasterSubKey each corresponding character in at least one plaintext page to produce a new MasterSubKey result, dropping the most significant digit of the MasterSubKey result if the MasterSubKey result is longer in length than one character, and replacing the corresponding character in the MasterSubKey by the MasterSubKey result.

15. The method of claim 14, where the encryption is performed without the use of an encryption table.

16. The method of claim 7, where the encryption is performed without the use of an encryption table.

17. The method of claim 7, wherein the encryption of information passing from the first device to the second device becomes more secure as the amount of plaintext which is encrypted and sent from the first device to the second device increases.

18. The method of claim 7, wherein the digits of the encryption key do not repeat periodically as the key is updated.

19. The method of claim 7, wherein the encryption and decryption require at most 6 integer arithmetic operations per digit of plaintext encrypted and per digit of cyphertext decrypted.

20. The method of claim 7, wherein the encryption and decryption require at most 2 integer arithmetic operations per digit of plaintext encrypted and per digit of cyphertext decrypted.

21. A method of encrypting a plaintext string of multi-bit digits stored on a sending computer device using a multi-digit encryption key, comprising:

(a) on the sending computer device, adding one digit of said plaintext string to a corresponding digit of at least one encryption key to produce a ciphertext result;

(b) on the sending computer device, truncating the most significant digit of the ciphertext result if the ciphertext result is longer than one digit;

(c) storing the ciphertext result on the computer device;

(d) updating the corresponding digit of said multi-digit encryption key using the at least one of the plaintext string or the ciphertext result to produce a key update result;

(e) if the end of the key is reached, repeating steps (a) through (d) with the updated key;

(f) repeating steps (a) through (e) until the end of the plaintext string is reached; and (g) sending the ciphertext toward a receiving device, wherein the encryption of the plaintext becomes more secure as the amount of plaintext which is encrypted increases, wherein the encryption requires at most 6 integer arithmetic operations per digit of plaintext encrypted.

22. The method of claim 21, where the encryption is performed without the use of an encryption table.

23. The method claim 21, wherein the updating the one digit of said key further comprises adding the corresponding digit of said key to a corresponding digit of the at least one of the plaintext string or the ciphertext result to produce the key update result; and truncating the most significant digit of the key update result if the key update result is longer than one digit.

24. The method of claim 21, wherein the digits of the encryption key do not repeat periodically as the key is updated.

25. The method of claim 21, wherein the encryption requires at most 2 integer arithmetic operations per digit of plaintext encrypted.

* * * * *